(12) United States Patent
Sebe

(10) Patent No.: US 9,506,159 B2
(45) Date of Patent: Nov. 29, 2016

(54) ORGANOMETALLIC ADHESION PROMOTERS FOR PAINT-OVER-CHROME PLATED POLYMERS

(71) Applicant: SRG Global, Inc., Warren, MI (US)

(72) Inventor: Elena Sebe, Novi, MI (US)

(73) Assignee: SRG Global, Inc., Warren, MI (US)

( * ) Notice: Subject to any disclaimer, the term of this patent is extended or adjusted under 35 U.S.C. 154(b) by 0 days.

(21) Appl. No.: 14/890,919

(22) PCT Filed: Apr. 22, 2014

(86) PCT No.: PCT/US2014/035004
§ 371 (c)(1),
(2) Date: Nov. 13, 2015

(87) PCT Pub. No.: WO2014/186097
PCT Pub. Date: Nov. 20, 2014

(65) Prior Publication Data
US 2016/0102415 A1    Apr. 14, 2016

Related U.S. Application Data

(60) Provisional application No. 61/823,804, filed on May 15, 2013.

(51) Int. Cl.
| | | |
|---|---|---|
| *B05D 1/36* | (2006.01) | |
| *B05D 7/04* | (2006.01) | |
| *B05D 7/14* | (2006.01) | |
| *C09D 5/08* | (2006.01) | |
| *C23C 18/32* | (2006.01) | |
| *C25D 3/04* | (2006.01) | |
| *C25D 3/12* | (2006.01) | |
| *C25D 5/56* | (2006.01) | |
| *C25D 5/54* | (2006.01) | |
| *C09D 201/00* | (2006.01) | |
| *B05D 3/10* | (2006.01) | |
| *B05D 7/00* | (2006.01) | |
| *C23C 18/38* | (2006.01) | |
| *C25D 3/38* | (2006.01) | |
| *B05D 7/02* | (2006.01) | |

(52) U.S. Cl.
CPC . *C25D 5/54* (2013.01); *B05D 1/36* (2013.01); *B05D 3/102* (2013.01); *B05D 7/14* (2013.01); *B05D 7/58* (2013.01); *C09D 5/08* (2013.01); *C09D 201/00* (2013.01); *C23C 18/32* (2013.01); *C23C 18/38* (2013.01); *C25D 3/12* (2013.01); *C25D 3/38* (2013.01); *B05D 7/02* (2013.01); *B05D 2350/65* (2013.01); *C25D 5/56* (2013.01)

(58) Field of Classification Search
None
See application file for complete search history.

(56) References Cited

U.S. PATENT DOCUMENTS

| | | | | |
|---|---|---|---|---|
| 3,653,947 A | * | 4/1972 | Kandler | ......... C23C 18/30 |
| | | | | 106/1.27 |
| 4,791,168 A | * | 12/1988 | Salatin | ......... C08G 18/0823 |
| | | | | 427/407.1 |
| 5,108,793 A | * | 4/1992 | van Ooij | ......... C04B 28/26 |
| | | | | 422/13 |
| 6,511,752 B1 | * | 1/2003 | Yao | ......... B05D 1/36 |
| | | | | 106/287.1 |
| 7,862,862 B2 | | 1/2011 | Cui | |
| 2004/0115354 A1 | | 6/2004 | Filippou et al. | |
| 2005/0118429 A1 | | 6/2005 | Taylor | |
| 2006/0193988 A1 | | 8/2006 | Walter et al. | |
| 2009/0054587 A1 | | 2/2009 | Oshimi et al. | |
| 2013/0081950 A1 | * | 4/2013 | Okerberg | ......... C09D 5/084 |
| | | | | 205/50 |

OTHER PUBLICATIONS

International Search Report and Written Opinion of the ISA for PCT/US2014/035004, ISA/KR, Daejeon, mailed Aug. 21, 2014.

* cited by examiner

*Primary Examiner* — Ramsey Zacharia
(74) *Attorney, Agent, or Firm* — Harness, Dickey & Pierce, P.L.C.

(57) ABSTRACT

Provided are robust paint coating systems on metal-coated plastic substrates and processes for forming such material systems as decorative components. An organometallic adhesion promoter is applied to a metal-coated plastic substrate. The metal coating comprises chromium (Cr), nickel (Ni) or combinations thereof. The organometallic adhesion promoter comprises (i) a transition metal selected from the group consisting of: zirconium (Zr), titanium (Ti), chromium (Cr), and combinations thereof, (ii) a first ligand complexed to the transition metal comprising an organofunctional group, and (iii) a second ligand complexed to the transition metal having a hydrolysable functional group. Then, one or more organic paint precursor materials are applied thereon. The hydrolysable functional group is capable of reacting with the metal-coated substrate and the organofunctional group with at least a portion of the organic paint precursor material to form a robust polymeric paint coating having a robust bond with the metal-coated plastic substrate below.

28 Claims, No Drawings

ORGANOMETALLIC ADHESION PROMOTERS FOR PAINT-OVER-CHROME PLATED POLYMERS

CROSS-REFERENCE TO RELATED APPLICATIONS

This application is a 371 U.S. National Stage of International Application No. PCT/US2014/035004, filed Apr. 22, 2014. This application claims the benefit of and priority to U.S. Provisional Application No. 61/823,804, filed May 15, 2013. The entire disclosures of the above applications are incorporated herein by reference.

FIELD

The present disclosure relates to transition metal based organometallic adhesion promoters for improving paint coatings formed on metal-coated polymeric substrates, such as multilayered paint-over-chrome systems.

BACKGROUND

This section provides background information related to the present disclosure which is not necessarily prior art.

Plastic components are used in vehicles, such as automobiles, to provide reduced weight, cost, and increased corrosion resistance advantages, among other benefits. Many such plastic components are used for decorative purposes and thus have metal-coated surfaces. For example, chrome-plated surfaces comprise chromium and are commonly employed over plastic substrates. Accordingly, chrome-plated plastic materials are often used as decorative components, for example, in detailing, trim features such as grills, or as indicia of brands, logos, emblems, and the like. However, such decorative components are used in a wide variety of applications, such as consumer goods, appliances, reflector components, and the like, and are not limited to merely vehicles. Because chrome-plated plastic decorative components may be used in applications where they are exposed to moisture or other environmental conditions, including extreme weather conditions and exposure to UV radiation or corrosive agents, such chrome-plated plastic components may suffer from degradation or corrosion.

While chromium-containing surfaces have the ability to withstand corrosion under certain conditions, issues with surface corrosion on the chrome-plated surface may still occur. This is particularly true for automotive exterior components, because such chrome-plated surfaces may encounter significant moisture and other corrosive agents applied to road surfaces, such as deicing agents and dust suppression agents. The appearance of corrosion is unsightly to automobile owners and can create warranty issues. Thus, clear or colored paints are often applied over chrome-plated surfaces to provide additional protection. Colored or tinted organic polymer coatings containing a dye, pigment or other colorants formed over metal-plating can provide various distinct metallic finishes. However, organic paint coatings formed over chrome-plating have typically resulted in weak bonding and insufficient adhesion. Such painted chrome-plated plastic components have not been able to achieve sufficient robustness to be routinely used for exterior applications in vehicles. For example, the adhesion of current paint coatings applied over a chrome-plating tends to be insufficient to demonstrate necessary stone chip resistance or resistance to other routine physical forces, thus making it susceptible to not only chipping and other damage, but also ensuing corrosion.

Furthermore, over time many conventional paint and primer coatings are susceptible to degradation in the presence of water and other environmental conditions. Various conventional organic paint coatings have been observed to lose their initial adherence levels and bond strength to the underlying metal-coated substrate upon prolonged exposure to moisture/water. As such, paint over chrome has generally been considered a nonviable design option for surfaces of components that are exposed to extensive moisture, environmental and/or road conditions. It would be desirable to increase robustness of paint coatings formed over metal-coated plastic substrates, so that the organic paint coatings exhibit improved initial bond strength, have superior resistance to chipping and other minor physical damage, while also exhibiting sustained bond strength when exposed to water and various other environmental conditions.

SUMMARY

This section provides a general summary of the disclosure, and is not a comprehensive disclosure of its full scope or all of its features.

In certain aspects, the present disclosure provides methods for forming robust polymeric paint coatings on metal-coated substrates. The robust polymeric paint coating over the metal-coated substrate may be used as a decorative component. For example, in one variation, the method comprises applying an organometallic adhesion promoter to a surface of the metal-coated substrate. The substrate may be plastic. The metal-coated substrate comprises a first metal selected from the group consisting of: chromium (Cr), nickel (Ni), combinations, and alloys thereof. The organometallic adhesion promoter comprises (i) a second metal selected from the group consisting of: zirconium (Zr), titanium (Ti), chromium (Cr), and combinations thereof, (ii) a first ligand complexed to the second metal comprising an organofunctional group, and (iii) a second ligand complexed to the second metal having a hydrolysable functional group. The method also comprises applying an organic paint precursor material over the organometallic adhesion promoter, so that the hydrolysable functional group of the second ligand of the organometallic adhesion promoter is capable of reacting with the metal-coated substrate and the organofunctional group of the first ligand reacts with at least a portion of the organic paint precursor material to form a robust polymeric paint coating.

In other aspects, the present disclosure provides a method for forming a robust polymeric paint coating on a metal-coated substrate. The robust polymeric paint coating over the metal-coated substrate may be used as a decorative component. The method comprises forming a metal coating on a plastic substrate, where the metal coating comprises a first metal selected from the group consisting of chromium, nickel, combinations, and alloys thereof. The method also comprises applying an organometallic adhesion promoter over the chromium-containing metal coating. The organometallic adhesion promoter comprises (i) a transition metal selected from the group consisting of: zirconium (Zr), titanium (Ti), chromium (Cr), and combinations thereof, (ii) a first ligand complexed to the transition metal comprising an organofunctional group selected from the group consisting of: amino, glycidyloxy, epoxy, hydroxy, carboxy, allyl, vinyl, acrylate, meth(acrylate), and combinations thereof, and (iii) a second ligand complexed to the transition metal having an alkoxy group. The method also includes applying one or more layers of an organic paint precursor material over the organometallic adhesion promoter. The hydrolysable functional group of the second ligand of the organometallic adhesion promoter is capable of reacting with the metal-coated substrate and the organofunctional group of the first ligand reacts with at least a portion of the organic paint precursor material to form a robust polymeric paint coating on the plastic substrate.

In yet other aspects, the present disclosure provides robust polymeric paint coatings on metal-coated plastic substrates. The robust polymeric paint coating over the metal-coated substrate may be used as a decorative component. For example, in one variation, the disclosure provides a robust transparent polymeric paint coating system that comprises a metal coating on a plastic substrate. The metal coating comprises a first metal selected from chromium (Cr), nickel (Ni), combinations, and alloys thereof. An organometallic adhesion promoter layer is disposed over the chromium-containing metal coating. The organometallic adhesion promoter comprises (i) a transition metal selected from the group consisting of: zirconium (Zr), titanium (Ti), chromium (Cr), and combinations thereof, (ii) a first ligand complexed to the transition metal comprising an organofunctional group selected from the group consisting of: amino, glycidyloxy, epoxy, hydroxy, carboxy, allyl, vinyl, acrylate, meth(acrylate), unsaturated hydrocarbon groups, nitrogen-containing organic groups, halides, epoxides, and combinations thereof, and (iii) a second ligand complexed to the transition metal having a hydrolysable functional group selected from the group consisting of: an alkoxy group, an aryloxy group, and a carboxy group. The robust transparent polymeric paint coating system also includes one or more layers of a polymeric paint coating disposed over the organometallic adhesion promoter. The hydrolysable functional group of the second ligand of the organometallic adhesion promoter is capable of reacting with the metal coating on the substrate and the organofunctional group of the first ligand reacts with at least a portion of the polymeric paint coating to form a robust bond between the polymeric paint coating and the metal-coated plastic substrate.

Further areas of applicability will become apparent from the description provided herein. The description and specific examples in this summary are intended for purposes of illustration only and are not intended to limit the scope of the present disclosure.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges. Example embodiments will now be described more fully herein.

Multilayer paint over chrome (POC) processes are commonly used to form metallic decorative finishes on plastics. In such techniques, a surface of the plastic is metallized and then coated with one or more organic layers of paint primer and/or paint. For example, the surface of the plastic may have one or more metal layers deposited thereon, usually by a plating process. Often, distinct layers of metals are deposited on one another to form the desired metallic finish over certain regions of the plastic substrate. The outer exposed metal layers typically comprise chromium, nickel, combinations, or alloys thereof for forming chrome-plated and/or nickel-plated finishes. After one or more metal layers are deposited on the plastic surface, one or more organic polymeric coatings are applied over the metallized surface regions. The one or more organic polymeric coatings may be transparent. Such organic polymeric coating layers may include one or more primer layers and one or more paint or topcoat layers to form the paint coating. The precursors of the organic polymer coatings can comprise one or more pigments, colorants, or dyes, which can form colored or tinted metallic finishes. Full or partial transparency of the organic polymer coating enables at least a portion of the underlying chrome-plating to be visible and creates a metallized decorative finish, which may be clear, tinted, or colored. The paint over metal/chrome plastic substrate may thus be used as a decorative component.

While a wide variety of tinted or colored metal finishes are possible, the use of organic coatings on metal-coated plastic substrates, especially chrome-plated plastic substrates, has been quite limited. While such metallic finishes may initially have desired aesthetics, poor adhesion between the organic coating and the chrome-plated surface frequently cause delamination and corrosion, especially after prolonged exposure to humidity, water, high temperatures, or other extreme environmental conditions. Thus, even conventional organic polymer coating compositions that initially exhibit good adhesion over chrome-plating have failed to exhibit adequate long-term adherence and durability for certain product applications exposed to harsh environmental conditions. This is true even for organic polymer coating compositions that employ primers or conventional silane-based adhesion promoting compounds. For example, it appears that silane-based adhesion promoting compounds remain reactive, especially on metal-coated surfaces that comprise chromium and/or nickel, so that when the organic coating is exposed to environmental conditions having extensive humidity, moisture, and/or high temperatures, the organic coating with a silane-based compound appears to remain reactive and suffer from unacceptable levels of bond decomposition over time.

Accordingly, the present technology offers an alternative multilayer paint over chrome (POC) system that employs organometallic adhesion promoting compounds disposed over chrome-plating or other metal layers, which enables high initial bond strength, sustained bond stability and adherence, and physical robustness of the coating system when exposed to harsh environmental conditions. Thus, in certain variations, the present disclosure provides new processes for forming robust polymeric paint coating systems on metal-coated substrates. In other aspects, the present disclosure provides a robust multilayer paint-over-metal system having a decorative metallic finish. The robust polymeric paint coating over the metal-coated substrate may be used as a decorative component. In certain aspects, a process forming such a robust multilayer paint-over-metal system having a decorative metallic finish involves applying an organometallic adhesion promoter to a surface of the metal-coated substrate.

In certain variations, the present technology pertains to a metal-coated substrate that comprises a metal selected from the group consisting of: chromium (Cr), nickel (Ni), combinations, and alloys thereof. In various aspects, the organometallic adhesion promoter employed in the inventive coating system comprises an organometallic compound. In certain variations, the organometallic adhesion promoter comprises (i) a transition metal selected from the group consisting of: zirconium (Zr), titanium (Ti), chromium (Cr), and combinations thereof. Thus, as described herein, the organometallic adhesion promoter complex may be a zirconate, titanate, or chromium-containing compound. The organometallic adhesion promoter compound further has at least two distinct ligands complexed to the transition metal. By "complexed," it is meant that the ligand is covalently or ionically bonded with the transition metal. In certain variations, each ligand may be complexed with the transition metal as a single dentate moiety or as a multi-dentate moiety.

In certain aspects, a first ligand complexed to the transition metal comprises an organofunctional group. By "organofunctional," it is meant that the ligand includes at least one reactive functional group that is capable of bonding or stable association with a species in the organic polymeric layer(s). In certain variations, the organofunctional group is selected from the group consisting of: amino, glycidyloxy, epoxy, hydroxy, carboxy, allyl, vinyl, acrylate, meth(acrylate), other unsaturated hydrocarbon groups, nitrogen-containing organic groups other than amino groups, halides, epoxides, and combinations thereof. Additional specific examples of such functional groups will be described in greater detail below.

A second distinct ligand complexed with the transition metal may comprise a functional group that is capable of bonding or associating with the metal-coated layer comprising chromium, nickel, alloys, or combinations thereof. Such a functional group may be considered to be a hydrolysable group. Thus, in certain aspects, such a ligand may be an alkoxy group having 1 to 30 carbon atoms and optionally 1 to 20 carbon atoms, aryloxy having 1 to 30 carbon atoms and optionally 1 to 20 carbon atoms, or carboxyl groups having 1 to 30 carbon atoms and optionally 1 to 20 carbon atoms, which are capable of reacting or stably associating with moieties or species on the surface of the metal-plating. In certain variations, the metal functional group may be methoxy, ethoxy, propoxy, or acetoxy groups.

While valence of the transition metal (e.g., Ti, Zr, or Cr) in the organometallic adhesion promoter depends on the reaction conditions and ligands present, a representative structure for embodiments of suitable organometallic adhesion promoter is set forth in Formula I:

                                                        (I), where M is a transition metal selected from Ti, Zr, and Cr and $R^1$, $R^2$, $R^3$, and $R^4$ are ligands complexed to the transition metal M. In the structure of Formula I, a-c are 0 or 1 and n+a+b+c=4. Preferably, a-c are 1. For example, $R^1$ is a metal functional hydrolysable group. $R^1$ preferably has an oxygen group, —O—Y, where Y may be a straight or branched, saturated or unsaturated alkyl, alkenyl, cycloalkyl, or aryl group having 1 to 30 carbon atoms, optionally 1 to 20 carbon atoms, and in certain variations, 1 to 10 carbon atoms, where $R^1$ thus forms an alkoxy, aryloxy, or carboxyl group. Thus, $R^1$ may contain an oxygen group bonded to the metal (M—O—Y) and may be selected from the group consisting of: methoxy, ethoxy, methoxy, ethoxy, propoxy, isopropoxy, butoxy, isobutoxy, tert-butoxy, pentyloxy, tert-pentyloxy, neo-pentyloxy, hexyloxy, isohexyloxy, aryloxy, phenoxy, tolyloxy, xylyloxy, and the like.

Ligands $R^2$, $R^3$, and $R^4$ are independently selected from one another and may contain one or more heteroatoms comprising oxygen, nitrogen, sulfur or phosphorus. In certain variations, $R^2$, $R^3$, and $R^4$ may optionally contain the one or more heteroatoms bonded to the transition metal M and may combine with one another to form a cyclic ring structure. At least one of $R^2$, $R^3$, and $R^4$ comprises an organofunctional group. The organofunctional group may be selected from the group consisting of amino groups, including primary, secondary, tertiary, and quaternary amines, epoxy, glycidyloxy, hydroxyl groups, carboxy groups, allyl, vinyl, acrylate, meth(acrylate), other unsaturated hydrocarbon groups, nitrogen-containing organic groups other than amino groups, halides, epoxides, phosphato and pyrophosphate groups, aryl sulfonyl groups, such as benzene-sulfonyl, and combinations thereof. Such functional groups may be provided as independent ligands or further incorporated or substituted into a hydrocarbon, so long as the group remains reactive.

Suitable examples of substituted or unsubstituted hydrocarbon groups from which $R^2$, $R^3$, and $R^4$ may be selected include straight or branched and saturated or unsaturated alkyl groups having 1 to 30 carbon atoms, optionally 1 to 20 carbon atoms, optionally 1 to 10 carbon atoms, and cycloalkyl and aryl groups having 1 to 30 carbon atoms, optionally 1 to 20 carbon atoms, optionally 1 to 10 carbon atoms. As noted above, such hydrocarbon groups may be substituted with one or more heteroatoms (e.g., O, N, P, S) or with the organofunctional groups listed above. For example, suitable hydrocarbon ligands having an organofunctional group may include, alkylamino, polyalkylamino, alcohols, polyols, alkylcarboxyl, alkenylcarboxyl, alkylsulfonyl, aryl or aralkylsulfonyl, phosphato-alkyl, pyrophosphato-alkyl, alklyene, alkyl acrylates, alkyl methacrylates, alkyl halides, and alkyl epoxides. In addition to the various organofunctional groups and hydrocarbyl ligands discussed above, $R^2$, $R^3$, and $R^4$ may also be a hydrogen or hydroxyl group.

Selection of the ligands ($R^1$-$R^4$) may be tailored to the particular multilayer system in which the organometallic adhesion promoter is to be used. For example, the metal functional group (e.g., $R^1$) may be selected for optimal reactivity with the metal-plating comprising chromium or alternatively, nickel on the exposed surface. Furthermore, one or more organofunctional groups (e.g., $R^2$-$R^4$) can be selected to optimize reactivity and bonding with one or more precursors in the organic layer (e.g., with the organic precursors in a paint primer or paint). By way of example, suitable non-limiting examples of $R^1$ groups that react with metals include methoxy ($OCH_3$) and ethoxy ($OC_2H_5$) groups.

For example, amino groups are generally recognized as being reactive with thermoplastics, such as polyacrylates (PA), polycarbonates (PC), polyethylene (PE), polypropylene (PP), polystyrene (PS), polybutylene terephthalate (PBT), polyvinylchloride (PVC), poly(p-phenylene oxide) (PPO), polyphenylene sulfide (PPS), or polysulfone (PSU) and thermosets, such as polyurethanes (PU), epoxy (EP), melamine formaldehyde (MF), and phenolics (PF). In certain variations, the amino group is a secondary amine group.

Epoxy and glycidyloxy functional groups are generally recognized as being reactive with thermoplastics such as acrylonitrile butadiene styrene (ABS), polystyrene (PS), polybutylene terephthalate (PBT), and polyvinyl acetate (PVAC) and thermosets such as polyurethanes (PU), epoxy (EP), melamine formaldehyde (MF), and phenolics (PF).

Suitable examples of organofunctional groups (e.g., $R^2$-$R^4$) include chloro groups, such as chloropropyl (Cl$(CH_2)_3$), vinyl groups ($CH_2$=CH), methyloxy groups, such as methylacryloxypropyl ($CH_2$=C($CH_3$)COO$(CH_2)_3$), aliphatic epoxide groups, such as glycidyloxy, glycidyloxyalkyls, such as glycidyloxypropyl

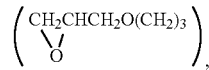

mercapto groups, such as mercaptopropyl (HS$(CH_2)_3$), amino groups, such as aminopropyl ($NH_2(CH_2)_3$), and amino diamino groups, such as N-β-(aminoethyl)aminopropyl ($NH_2CH_2CH_2NH(CH_2)_3$).

Unsaturated hydrocarbon groups, such as vinyl functional groups, can be reactive with thermoplastics such as polystyrene (PS), ethylene vinyl acetate (EVA), polyethylene (PE), and polypropylene (PP). Vinyl functional groups are also reactive with thermosets such as unsaturated polyesters.

Methacryl functional groups are known to react with moieties in thermoplastics such as polystyrene (PS), acrylonitrile butadiene styrene (ABS), polyethylene (PE), and polypropylene (PP). Methacryl functional groups are also reactive with thermosets such as acrylics, unsaturated polyesters, and diallyl phthalate (DAP).

Other suitable organofunctional groups for organometallic compounds include ethylene-diamino, which is reactive with thermoplastics like urethane (TPU), ethylene/vinylacetate (EVA), cellulose acetate butyrate (CAB) and thermosets like polyurethane (PU). Likewise, amino-phenyl functional groups are generally recognized as being reactive with polyurethane (PU) thermosets, as well as with thermoplastics like polycarbonate (PC), polyphenylene oxide (PPO), polyphenylene sulfide (PPS), acrylonitrile butadiene styrene (ABS), and polyoxymethylene (acetal) (POM). (Pyro)phosphato functional groups are generally recognized as being reactive with thermoplastics such as polyamide (PA), polyethylene (PE), polypropylene (PP), polyvinyl chloride (PVC), polystyrene (PS), and polyethylene terephthalate (PET) and thermosets such as acrylics, phenol formaldehyde resins (PF), unsaturated polyesters (UP), and epoxy (EP). Benzene-sulfonyl is another suitable organofunctional group, generally recognized as being reactive with polyethylene (PE), polypropylene (PP), and polysulfone (PSU) thermoplastics and epoxy thermoset polymers.

In certain variations, at least one of $R^2$-$R^4$ ligands comprises an organofunctional group comprising a functional group selected from the group consisting of: amino, glycidoxy, epoxy, hydroxy, carboxy, allyl, vinyl, acrylate, meth(acrylate), and combinations thereof. In certain variations, at least one of $R^2$-$R^4$ ligands comprises an organofunctional group comprising an amino, a carboxy, and/or a methacryloxy group. In certain other variations, at least one of $R^2$-$R^4$ ligands comprises a secondary amine group as an organofunctional group incorporated into a hydrocarbyl ligand.

In certain variations, at least one of $R^2$-$R^4$ ligands comprises an organofunctional group comprising an amino group. Thus, in certain variations the organometallic promoter compound may be $(R^1)_n$-$M(R^2)_a(R^3)_b(R^4)_c$, where $R^2$ has oxygen as a heteroatom and an amino organofunctional group incorporated into the ligand as —O—$(CH_2)_y NH_2$, where a is 1 and y is 1 to 30, optionally 1 to 20, and in certain aspects, 1 to 10. In such a variation, the oxygen is bonded to the metal M. In other variations, the organometallic promoter compound may an $R^2$ ligand with an amino functional group as —$(CH_2)_y NH_2$, where a is 1 and y is 1 to 30, optionally 1 to 20, and in certain aspects, 1 to 10. In other variations, $R^2$ ligand may have an amino functional group incorporated within a hydrocarbyl chain, such as —O—$(CH_2)_y$NRR' or —$(CH_2)_y$NRR', where R and R' are straight or branched alkyl groups having 1 to 30 carbon atoms, optionally 1 to 20 carbon atoms, and in certain variations, 1 to 10 carbon atoms. In these various embodiments, M comprises Zr, Ti, or Cr and $R^1$ may be any of the metallic functional groups discussed above having an oxygen bonded to metal M and a hydrocarbyl group Y (M-O—Y). In certain aspects, $R^1$ is an aryloxy, having a straight or branched alkyl group, such as methoxy, ethoxy, isopropyloxy, by way of non-limiting example. $R^3$ and $R^4$ may be any of the ligands discussed above, where b and c are both 1. In certain variations, $R^3$ and $R^4$ may be the same $R^2$, while in other variations, $R^3$ and $R^4$ may comprise one or more distinct organofunctional groups or ligands. In certain variations, $R^3$ and $R^4$ do not contain any reactive functional groups, although they may contain heteroatoms. In certain aspects, $R^3$ and $R^4$ are straight or branched alkyl groups having 1 to 30 carbon atoms, optionally 1 to 20 carbon atoms, and in certain variations, 1 to 10 carbon atoms.

In yet other variations, the organometallic promoter compound may be $(R^1)_n$-$M(R^2)_a(R^3)_b(R^4)_c$, where $R^2$ has oxygen as a heteroatom and an amino organofunctional group incorporated into the ligand as —O—R"$NH_2$, where a is 1 and where R" can be a straight or branched alkyl group having 1 to 30 carbon atoms, optionally 1 to 20 carbon atoms, and in certain variations, 1 to 10 carbon atoms. In such a variation, the oxygen is bonded to the metal M. In other variations, the organometallic promoter compound may an $R^2$ ligand with an amino functional group as —R"$NH_2$, where a and R" are as defined above. In other variations, $R^2$ ligand may have an amino functional group incorporated within a hydrocarbyl chain, such as —O—R"NRR' or —R"NRR', where R, R', and R" are straight or branched alkyl groups having 1 to 30 carbon atoms, optionally 1 to 20 carbon atoms, and in certain variations, 1 to 10 carbon atoms. In these various embodiments, M comprises Zr, Ti, or Cr and $R^1$ may be any of the metallic functional groups discussed above having an oxygen bonded to metal M and a hydrocarbyl group Y (M-O—Y). In certain aspects, $R^1$ is an aryloxy, having a straight or branched alkyl group, such as methoxy, ethoxy, isopropyloxy, by way of non-limiting example. $R^3$ and $R^4$ may be any of the ligands discussed above, where b and c are both 1. In certain variations, $R^3$ and $R^4$ may be the same $R^2$, while in other variations, $R^3$ and $R^4$ may comprise one or more distinct organofunctional groups or ligands. In certain variations, $R^3$ and $R^4$ do not contain any reactive functional groups, although they may contain heteroatoms. In certain aspects, $R^3$ and $R^4$ are straight or branched alkyl groups having 1 to 30 carbon atoms, optionally 1 to 20 carbon atoms, and in certain variations, 1 to 10 carbon atoms.

In certain aspects, the organometallic adhesion promoter compounds may be a zirconate organometallic compound selected from the group consisting of: neoalkoxytris(m-aminophenyl) zirconate, neoalkoxytris(ethylenediaminoethyl) zirconate, neoalkoxytrisneodecanoyl zirconate, neoalkoxytris(dodecanoyl)benzene sulfonyl zirconate, neoalkoxytris(dodecyl)benzenesulfonyl zirconate, zirconium propionate, neoalkoxytris(dioctyl)phosphate zirconate, neoalkoxytris(dioctyl)pyrophosphate zirconate, tris(dioctylpyrophosphate)ethylene titanate, tetra(2,2-diallyloxymethyl)butyl, bis(ditridecyl)phosphito zirconate, neopentyl(diallyl)oxytrisneodecanoyl zirconate, neopentyl(diallyl)oxytris(dodecyl)benzenesulfonyl zirconate, neopentyl(diallyl)oxytris(dioctyl)phosphate zirconate, neopentyl(diallyl)oxytris(dioctyl)pyrophosphate zirconate, tris(dioctylpyrophosphate)ethylene titanate, neopentyl(diallyl)oxytris(N-ethylenediamino)ethyl zirconate, neopentyl(diallyl)oxytris(m-amino)phenyl zirconate, neopentyl(diallyl)oxytrismethacryl zirconate, neopentyl(diallyl)oxytrisacryl zirconate, dineopentyl(diallyl)oxydiparamino benzoyl zirconate, dineopentyl(aiallyl)oxy bis(3-mercapto) propionic zirconate, zirconium IV 2-ethyl, and 2-propenolatomethyl 1,3-propanediolato, cyclo di2,2-(bis 2-propenolatomethyl)butanolato pyrophosphato-O,O,tetra(2,2 diallyloxymethyl)butyl, neopentyl(diallyl)oxy, trimethacryl zirconate, and combinations thereof.

In certain alternative variations, the organometallic adhesion promoter may comprise both zirconate and aluminum metals. Suitable aluminozirconates include methacryloxy aluminozirconate, by way of non-limiting example.

In certain other aspects, the organometallic adhesion promoter compounds may be a titanate organometallic compound selected from the group consisting of: isopropyl tris(N-ethylaminoethylamino)titanate, isopropyl triisostearoyl titanate, titanium bis(dioctylpyrophosphate)oxy acetate, tetraisopropyl bis(dioctylphosphito)titanate, neoalkoxytri[p-N-(β-aminoethyl)amino phenyl]titanate, isopropyl trioctanoyl titanate, isopropyl diisostearoylcumylphenyl titanate, isopropyl tricumylphenyl titanate, isopropyl distearoylmethacryl titanate, isopropyl diniethacrylisostearoyl titanate, isopropyl tris(dodecylbenzenesulfonyl)titanate, isopropyl diisostearoylacryl titanate, isopropyl diisostearoylacryl titanate, isopropyl isostearoyldiacryl titanate, isopropyl isostearoyldiacryl titanate, isopropyl tris(dioctylphosphate)titanate, isopropyl tri-n-stearoyl titanate, isopropyl 4-aminobenzenesulfonyl-bis(dodecylbenzenesulfonyl) titanate, isopropyl trimethacryl titanate, isopropyl trimethacrylonitrile titanate, isopropyl bis(4-aminobenzoyl) isostearoyl titanate, isopropyl tris(dioctylpyrophosphate)titanate, tris(dioctylpyrophosphate)ethylene titanate, isopropyl triacryl titanate, isopropyl tris(N,N-dimethyl-ethylamino)titanate, isopropyl tris(N-ethylaminoethylamino)titanate, isopropyl triacryl titanate, isopropyl tris(N,N-dimethyl-ethylamino)titanate, isopropyl tris(N-ethylamino-ethylamino)titanate, isopropyl trianthranyl titanate, isopropyl tris(octylbutylpyrophosphate)titanate, and isopropyl tris(butylmethylpyrophosphate)titanate, octylene glycol titanate, (tetrakis) 2-ethylhexane-1,3-(diolato)titanate, tetrakis(biethylamido)titanate, tetraisopropylbis(dioctylphosphite)titanate, tetraoctylbis(ditridecylphosphite)titanate, tetra(2,2-diallyloxymethyl-1-butyl)bis(ditridecyl)phosphite titanate, diisostearoyl oxyacetatetitanate, isostearoyl methacryloxyacetatetitanate, isostearoyl acryloxyacetatetitanate, bis(dioctylphosphate)oxyacetatetitanate, 4-amino benzenesulfonyldodecylbenzene sulfonyloxyacetatetitanate, dimethacryloxyacetatetitanate, dicumylphenolateoxyacetate titanate, 4-aminobenzoylisostearoyloxyacetate titanate, bis(dioctylpyrophosphate)oxyacetate titanate, diacryloxyacetate titanate, bis(octylbutylpyrophosphate)

oxyacetate titanate, diisostearoylethylene titanate, isostearoylmethacrylethylene titanate, bis(dioctylphosphate)ethylene titanate, 4-aminobenzenesulfonyldodecylbenzenesulfonylethylene titanate, dimethacrylethylene titanate, 4-aminobenzenesulfonylisostearoylethylene titanate, bis(dioctylpyrophosphate)ethylene titanate, diacrylethylene titanate, dianthranylethylenetitanate, bis(butylmethylpyrophosphate)ethylene titanate, and combinations thereof.

Various organometallic additives are commercially available from Chartwell International, Inc., KEN-REACT KR™, KZ™, LICA™ product lines from Kenrich Petrochemicals, Inc., TYZOR™ products from E.I. du Pont de Nemours and Co., and PLENACT KR™ product lines from Ajinomoto Fine-Techno Co., Inc.

In certain variations, the organometallic adhesion promoter may comprise chromium metal. Suitable chromium based adhesion promoters include coordination complexes of trivalent chromium chloride and carboxylic, acrylic, or methacrylic acids, such as trivalent chromium (Cr(III)) methacrylate, and trivalent chromium fumarato-coordination compound, by way of non-limiting example.

Thus, in various aspects, methods are provided for forming a robust polymeric paint coating on a metal-coated plastic substrate. Thus, the methods comprise applying an organometallic adhesion promoter to a surface of the metal-coated substrate comprising a metal selected from the group consisting of: chromium (Cr), nickel (Ni) and combinations thereof. As discussed above, the organometallic adhesion promoter comprises (i) a transition metal selected from the group consisting of: zirconium (Zr), titanium (Ti), chromium (Cr), and combinations thereof, (ii) a first ligand complexed to the transition metal comprising an organofunctional group, and (iii) a second ligand complexed to the transition metal having a metal functional group, such as a hydrolysable functional group.

As noted above, the metal-coated plastic substrate may be formed on a polymeric or plastic substrate. Suitable plastic substrates include by way of non-limiting example acrylonitrile butadiene styrene (ABS), acrylonitrile butadiene styrene/polycarbonate (ABS/PC), polycarbonate (PC), polyamide (PA), polypropylene (PP), polyolefins, thermoplastic olefins (TPOs), polyphenyleneoxide (PPO), polyphenylene ether, polyimides, polyether imide (PEI), polyether ether ketone (PEEK), polyphenylene sulfide, polyphthalamide, polyurethane (PU), polybutylene terephthalate (PBT), polycarbonate/polybutylene terephthalate (PC/PBT), polyacrylates, polyesters, polyethers, polyketones, combinations, and blends thereof. A variety of polymers, including those listed above, are suitable for embodiments where a metal coating, such as a chromium-containing coating, is formed by physical vapor deposition (PVD) or chemical vapor deposition (CVD) techniques. However, in certain aspects, acrylonitrile butadiene styrene (ABS) and acrylonitrile butadiene styrene/polycarbonate (ABS/PC) are particularly preferred plastics for embodiments where the metal coating containing chromium and/or nickel is formed by a wet chemistry/electroplating process.

Metallization to form a chromium-containing coating or a nickel-containing coating on a plastic component may occur by using conventional wet chemistry techniques (e.g., electroless or electroplating), physical vapor deposition (PVD), or chemical vapor deposition (CVD). Therefore, the methods of the present disclosure may further include forming a metal coating comprising a metal selected from the group consisting of: chromium (Cr), nickel (Ni) and combinations thereof on a surface of the plastic substrate. However, in certain embodiments, the substrate may be received already containing a metal coating disposed thereon. The methods may include metallizing a surface of the plastic substrate to form a chromium-containing or nickel-containing surface layer. By way of example, the plastic substrate to be plated can first be washed, treated, and/or etched, followed by optional electroless deposition of one or more metal containing layers and/or electroplating of one or more metal-containing layers to form the metal-coated surface. In certain embodiments, the metal-coated surface may comprise a chromium-containing surface coating formed in an electroplating process where the electrolyte comprises trivalent chromium (Cr(III)) or hexavalent chromium (Cr(VI)).

By way of example, one particularly suitable metallization process includes a direct wet chemistry metallization process that includes wet etching, followed by an electroless plating process, and then a sequence of electroplating baths. Such a direct wet chemistry process can apply a chromium-containing surface coating to the plastic substrate. The etching may be conducted by immersing the surface of the plastic substrate (or entire plastic substrate, for example, including a rack holding the plastic component) in an etching solution. The pH of the etching solution can range from acid to alkaline, but is preferably acidic. It will be appreciated by those of skill in the art that selection of acid, control of the temperature, immersion time and other conditions will allow preferential etching of the plastic substrate. In various embodiments, the etching solution comprises chromium, such as trivalent chromium (Cr(III)) or hexavalent chromium (Cr(VI)). Additionally the etching solution may include an acid such as sulfuric acid, boric acid, phosphoric acid, or combinations thereof.

After etching, the surface of the plastic substrate can be subjected to an electroless plating process, which is an auto-catalytic process that applies a thin conductive metal layer (for example, a thin nickel-containing or copper-containing layer) onto the etched plastic surface, without the use of electric current. After electroless deposition of such a conductive metal layer, the surface to be plated can be further subjected to wet chemistry metallic processing, which is well known in the art. In certain aspects, the chromium-containing surface can be formed by a process of electroplating with a first electrolyte comprising trivalent chromium (Cr(III)) or electroplating with a second electrolyte comprising hexavalent chromium (Cr(VI)). In certain embodiments, the electroplating is conducted by employing an electrolyte comprising hexavalent chromium (Cr(VI)). One exemplary wet chemistry electroplating process that forms a metal-plated surface containing chromium on the plastic substrate includes first electroplating one or more copper layers (Cu) over the electroless-deposited layer (comprising for example, a conductive metal like nickel and/or copper), followed by electroplating one or more nickel-containing layers followed by a chromium-containing layer.

Similar plating processes known to those of skill in the art are used to form nickel finishes. Bright nickel chemistries lead to excellent ductility, high tolerance for overdosing and impurities and give a lustrous, shiny look. Satin nickel chemistries can be used as an alternative to bright nickel for a different matte appearance (silky matte, light satin or rough satin). Semibright nickel has an excellent corrosion resistance high ductility, excellent leveling and brightness properties and is used as a base layer in multilayer nickel systems. As such, the metal-coated surface may comprise one of chromium, nickel, or combinations or any alloys thereof.

In yet other aspects, the metal-containing surface coating can be formed on the plastic substrate by at least one of the processes of physical vapor deposition (PVD) of chromium or nickel metal or chemical vapor deposition (CVD) of chromium or nickel metal. Physical vapor deposition (PVD) technique is well known in the art. Vapor deposition is known as producing a film or metal onto a surface, often in a vacuum, either by decomposition of the vapor of a compound at the plastic surface or by direct reaction between the plastic surface and the vapor. During PVD process, a metal or metal alloy, such as chromium, is evaporated in a vacuum chamber, which condenses on and bonds to the surfaces of the plastic substrate to form a uniform metallized surface layer. Such vapor deposition techniques include thermal evaporation, cathodic arc evaporation or sputtering and the like. Chemical vapor deposition (CVD) is another well-known and conventional process. During CVD process, a metal or metal alloy, such as chromium or nickel, bonds to the surfaces of the plastic substrate to form a uniform metallized surface layer.

Therefore, any of the above processes can be used to create one or more layers of a metallized surface coating on plastic surfaces, such as a chromium-containing chrome surface finish or a nickel-containing metal surface finish. A thickness of the metal coating desirably provides the plastic substrate with mechanical strength and some corrosion resistance. As noted above, in certain variations, metal coatings may include a plurality of distinct sub-layers comprising different metals. For example, the chromium-containing coating may comprise a plurality of sub-layers, such as nickel-containing layers and copper-containing layers, which together form a metal-coated surface. In certain variations, the metallized surface layer can have a thickness of greater than or equal to about 25 µm to less than or equal to about 100 µm. Certain aspects of the present teachings are directed to treating an exposed surface of a metal coating that comprises chromium and/or nickel, which have posed particular challenges with regard to adhesion of subsequently applied polymeric coatings. Thus, the present disclosure provides improved adhesion of a polymeric coating to a metal-coated surface comprising chromium, and in certain alternative embodiments, comprising nickel.

The organometallic adhesion promoter is applied to one or more metallized or metal-coated regions of the surface of the plastic substrate. In certain aspects, the organometallic adhesion promoter is applied as one or more distinct layers coated over the metal-coated regions of the plastic surface. Thus, a spreadable material, such as a liquid or gel, comprising the organometallic adhesion promoter may be applied to the metal-coated surface. The spreadable material may comprise a carrier or solvent that optionally includes water or/or volatile organic solvents that can volatilize after being applied to the metal-coated surface to leave a coating of the organic adhesion promoting material thereon. By way of non-limiting example, suitable solvents are selected based upon the particular characteristics of the organometallic adhesion promoter compound, but generally may include alcohols, like methanol, ethanol, propanol, ketone solvents, such as acetone, methyl ethyl ketone, methyl isobutyl ketone, ether solvents, such as tetrahydrofuran, dioxane, diethylene glycol dimethyl ether, and polar solvents such as dimethylformamide, dimethylacetamide, N-methylpyrrolidone, ethylene glycol, diethylene glycol, diacetone alcohol and 1-methoxy-2-propanol.

The amount of carrier or solvent in the organometallic adhesion promoter can be adjusted to provide different viscosities depending upon the method of application to the metal-coated surface of the substrate. In certain aspects, a concentration of the organometallic adhesion promoter is greater than or equal to about 1 to less than or equal to about 50 weight % of the overall organometallic adhesion material applied to the metal-coated surface; optionally greater than or equal to about 2 to less than or equal to about 25 weight %; and optionally greater than or equal to about 3 to less than or equal to about 15 weight % of the overall organometallic adhesion material applied to the metal-coated surface. The organometallic adhesion promoter material may be applied by immersion, dipping, coating, spraying, spreading, roll coating, screen printing, or other known application techniques. After application, the organometallic material layer may be dried (e.g., by applying heat and/or reduced pressure), so that the carrier or solvent is substantially removed. Such applying processes of the organometallic adhesion promoter material may be conducted multiple times to form multiple layers, as necessary. The metal functional hydrolysable group of the second ligand of the organometallic adhesion promoter is thus capable of reacting with the metal-coated substrate comprising Cr and/or Ni, while the organofunctional group of the first ligand of the organometallic adhesion promoter is capable of reacting with at least a portion of the organic paint precursor material. In this manner, the present technology enables forming a robust, stable polymeric paint coating over the metal-coated plastic substrate.

Accordingly, the methods of the present disclosure further comprise applying an organic paint precursor material over the organometallic adhesion promoter. A paint precursor material includes one or more polymers or prepolymers, such as monomers or oligomers, which are capable of forming a film or polymeric paint coating. Film-forming polymers and/or polymer precursors include those polymers routinely used in paints and other coating compositions, especially those used for automotive and outdoor applications. Alternatively, film-forming polymer precursors are capable of curing, crosslinking, and/or coalescing upon application to a surface of a substrate to form a continuous layer or coating of paint material that is substantially impermeable to liquids, especially water. The polymer precursors may be cross-linked or cured by application of heat, actinic radiation or other methods of curing and treating polymeric precursor and polymers known to those of skill in the art.

Examples of suitable film-forming polymers generally include any polymer known for paint compositions, such as acrylic polymers, including one or more allyl esters of acrylic acid or methacrylic acid monomers, optionally copolymerized with one or more other ethylenically unsaturated monomers (e.g., vinyl monomers, allylic monomers, and acrylic monomers). Other suitable film-forming polymers include urethane resins, melamine resins, polyester resins, polyvinyl ester resins, polyvinylidene halides, epoxy resins, alkyd and alkyd-derived resins (polyesters modified by the addition of fatty acids and/or other components, derived from polyols and a dicarboxylic acid or carboxylic acid anhydride), as well as various hydroxyl, carboxyl, styrene and/or vinyl modified resins, and any combinations thereof. The film-forming polymers may be curable compositions (e.g., thermosets) or lacquers (e.g., thermoplastics). Examples of film-forming polymer precursors include one and two part compositions, which may contain polyols and polyisocyanates that react in situ to form polyurethanes, or those that contain polyamines and polyisocyanates that react to form polyureas, and the like. In certain preferred variations, the film-forming polymer precursors are selected from the group consisting of: methacrylates, acrylates, styrene, and combinations thereof.

In various aspects, the organic paint precursor material may include solvent borne or water born polymeric layers, as are well known in the art. Furthermore, organic polymeric paint coatings are often applied as two-part systems including one or more precursor materials that serve as a primer coating and one or more precursor materials that serve as the topcoat of paint. The paint precursor material may be applied as a liquid or as a powder (e.g., as a powder coating). The paint precursor materials may also be applied using electrophoretic deposition techniques.

In certain aspects, the robust, stable polymeric paint coating formed by applying paint precursor materials is transparent. While the polymeric paint coating composition may be opaque, in certain preferred aspects, the polymeric paint coating is either a clear paint coating or a tinted paint coating composition having a level of transparency that permits the underlying metallic-plated finish to be at least partially visible as part of the decorative aesthetics. Thus, the one or more organic precursors may include pigments, colorants or dyes, as are well known in the art. Tinted organic paint coatings may be used to permit bright, lustrous chrome surfaces to be visible, while imparting a color or tint to the chrome surface. In addition to decorative applications, the robust, stable polymeric paint coatings may be used as functional coatings, such as protective scratch-resistant or ultra-violet radiation resistant coatings, over chrome or other metal-coated surfaces.

In certain variations, desirable paint systems permit a metallic finish to show through the paint. Such paint systems can include both a clearcoat (optionally tinted) and a primer (sealer). In certain aspects, a preferred paint system may comprise methacrylates, acrylates, styrene, and combinations thereof.

In certain alternative variations, the organometallic adhesion promoter may be directly introduced into an organic paint precursor material that forms a layer of the polymeric paint coating applied to the metal-coated surface primer layer. Thus, in certain aspects, a sealer composition or a primer solution optionally contains one or more organofunctional organometallic adhesion promoter to increase adhesion of organic polymeric paint coating to the metal-plated plastic substrate. In other variations, an organic clearcoat comprises at least one organofunctional organometallic adhesion promoter, which increases adhesion of organic polymeric paint coatings to the metal-plated plastic substrate. It is noted, however, that potential undesirable interactions may occur between the organofunctional organometallic adhesion promoter and other materials in the organic paint precursor materials. Thus, in certain aspects it is preferable to apply the organometallic adhesion promoter as a separate distinct layer of material to achieve superior, stable, robust bonds with both the underlying metal-coated surface and the overlying organic polymeric paint coating. In this regard, the organometallic adhesion promoter applied as a distinct continuous layer ensures that maximal bonding and adhesion occurs between the metal-coated surface comprising Cr and/or Ni and the one or more layers of the organic polymeric paint coating subsequently applied.

Organofunctional organometallic adhesion promoter compounds can promote the adhesion of polymeric paints to metal coated substrates by creating chemical bridges between the inorganic and organic materials at their interface. For example, a polymeric matrix (P—OH) can be adhered to a metallic surface (MS—OH) using an organometallic complex ((R'O)$_{4-n}$M(RO)$_n$) as a coupling agent:

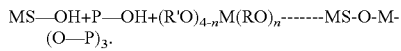

MS—OH+P—OH+(R'O)$_{4-n}$M(RO)$_n$-------MS-O-M-(O—P)$_3$.

The distinct layer(s) of organofunctional organometallic adhesion promoter help to maximize reaction of the hydrolysable functional group of the second ligand of the organometallic adhesion promoter and subsequent reaction between the organofunctional group of the first ligand and the organic paint precursor material to form a robust transparent polymeric paint coating.

Thus, the present disclosure provides methods for obtaining a robust, stable metallic decorative finish for automotive trim and other decorative applications by using a novel coating system. In certain variations, such a multi-layer paint over chrome (POC) coating system comprises a hexavalent or trivalent chrome-plating having organometallic adhesion promoter compounds and a translucent (clear or tinted) paint. In certain variations, the organometallic adhesion promoter compounds comprise an amino organofunctional group that is particularly advantageous in forming a robust, paint coating adhered to the chrome-plated plastic surface. Furthermore, such multi-layer paint over chrome systems are significantly more environmentally friendly in producing byproducts such as water, as compared to other silane-based adhesion promoters, which produce alkoxy byproducts, such as alcohols, which must be processed and handled according to various regulations.

In certain variations, a robust, stable multilayer paint-over-metal system on a plastic article having a decorative metallic finish according to certain aspects of the present teachings possesses desirable properties or characteristics, which are insufficient in conventional paint-over-metal systems. For example, a robust, stable multilayer paint-over-metal system on a plastic article according to the present technology is capable of achieving one or more of the following criteria or standard tests, thus making the decorative component suitable for use as an exterior part exposed to various harsh environmental conditions. A first parameter is that the robust paint coating system on a metal-coated plastic substrate exhibits corrosion resistance. It should be noted that in the discussion of desired properties, the test protocol are exemplary of those that may be used to determine such a parameter and are not necessarily limiting. Any other test parameters known or to be discovered by those of skill in the art and suitable results and values of such tests are also contemplated.

For example, corrosion resistance can be determined by subjecting a coated sample to multiple thermal cycles. Thus, the coated part may be exposed to three or four distinct thermal cycles, such as 90 minutes at −40° C., 15 minutes at 23° C., 1 hour at 90° C., and 15 minutes at 23° C. (ACC D25 1324). Another common test for corrosion resistance is a salt spray test, such as a Copper-Accelerated Acetic Acid Salt Spray (CASS) test (per ASTM G85 and ASTM B368). The CASS test is widely used to evaluate aggravated conditions such as road salt on automotive parts. The test specimen is subjected to a standardized solution of acetic acid with copper chloride in water. After either corrosion test, the test specimen is cleaned with demineralized water before evaluation. Results typically reflect testing hours without appearance of corrosion products. In this test protocol, corrosion resistance is determined by observing the surface of the paint-over-metal system on the plastic part. If there is no modification to the appearance of the coating, such as pin holes or micro-pin holes, corrosion points of mark, blister, cracks or fine cracks, then the paint-over-metal material coating is determined to be corrosion resistant. Thus, suitable multilayer paint-over-metal system on a plastic article for an exterior front category part has a CASS test value of greater than or equal to about 48 hours. In certain more rigorous applications, suitable multilayer paint-over-metal system on a plastic article have greater than or equal to about 80 hours.

Another alternative measure of cyclic corrosion resistance can be conducted by applying cross-cuts into the coated paint film over plated metal on the plastic article test specimen, where an accelerated cyclic corrosion test (CCT) is conducted. During such cyclic corrosion testing, coated specimens are exposed to a series of different environments in a repetitive cycle that mimics the outdoors. Simple cycles may include cycling between salt fog (a salt spray with sodium chloride) and dry conditions. More complex cycles, often employed for automotive exterior components, may include multi-step cycles that incorporate humidity or condensation, along with salt spray and drying.

A representative CCT cycle may include a step of saltwater spraying, followed by a forced drying step, a saltwater dipping step, and then natural drying. In certain variations, an exemplary cycle may include 17 hours of saltwater spraying, 3 hours of forced drying, 2 hours of a saltwater dipping, and then 2 hours of a natural drying step. These cycles may be repeated up to 60 or more times. A test period (the number of cycles) can be selected as required in consideration of the corrosion environment of parts. In cases where duration of working life is being assessed, additional test specimens can be prepared exclusively for that purpose.

Saltwater spraying can be carried out with temperatures inside the saltwater preheater, humidifier, and sprayer of about 50±1° C. during the test period. During the forced drying step, the test specimen can be placed in a dryer equipped with a ventilation fan to facilitate drying. The dryer temperature may be increased from room temperature (e.g., about 15 to 25° C.) up to about 70° C. with the fan in operation, and the temperature maintained at about 70±1° C. with a humidity at 35% or lower for the specified time period.

Next, for the saltwater dipping step, the test specimen may be placed in a plastic vessel. The vessel may be filled with salt water until the specimens are completely immersed. A lid is placed on the vessel and stored in a thermostatic oven controlled at about 50±1° C. The saltwater temperature desirably reaches about 50±1° C. by the time the test specimens are immersed.

For natural drying, the test specimens are placed in a room in such a manner that they dry easily. Though no special ventilation is required, in certain aspects, the room temperature is maintained at 20 to 30° C. during the drying period. After the desired number of CCT cycles are tested, the cut specimens may be tested for corrosion resistance.

For example, a tape peeling test can be conducted over the cross-cuts 3 times on both sides per 10 cycles of CCT testing, and repeated up to 60 cycles. Passing the test in certain aspects means that the peeled portion along each side is less than 3 mm. In certain aspects, cyclic corrosion resistance of a coating is demonstrated if the test is passed after 60 cycles. In certain variations, cyclic corrosion resistance may have no peeling whatsoever after 60 cycles.

Other desirable parameters of a robust paint coating systems on metal-coated plastic substrates include chip resistance, scratch resistance, impact resistance, and/or a desirable hardness. In certain aspects, the coating may optionally be weathered, exposed to harsh environmental conditions, or aged and then tested for such parameters to reflect ability for long-term robust bonding of the polymeric coating to the metal-plated substrate. For example, in one test method for chip resistance, a polymeric coating over metal on a plastic part is tested by first weathering the sample. For example, the sample can be tested by exposure to a Xenon "Weather-o-meter" available from Atlas Electric Company that contains a cooled xenon arc lamp system that emits radiation onto the test sample, such as is detailed in test method SAE-J-2527. Extended ultraviolet (UV) filters with 2500 kJ/m$^2$ exposure for the Xenon arc lamp may be used. After weathering, the coated sample can then be tested for chip resistance. In certain other test protocols for chip resistance, the coating may optionally be aged prior to being exposed to the chip testing protocol, for example, oven aged for 168 hours at 83° C., by way of example.

The chip resistance testing often involves a machine, such as a GRAVELOMETER™, which is designed to evaluate the resistance of surface coatings to chipping caused by the impact of stones or other flying debris. Typical chip resistance test procedures include ASTM D3170 or SAE J-400. The sample having the coating to be tested is subjected to 1 pint (which may be about 300 pieces) of stones or gravel. For example, the force may be selected to be about 70 psi, the pieces directed at the test sample at a 90° angle, and the temperature of about −18° C.

The test sample is then removed from the machine and gently cleaned with fabric. Tape is then applied to the tested surface and removed. The tape can pull off any loose fragments of the coating. The tested sample appearance is then compared to controls to determine if any damage has been incurred. A standard rating system is used, well-known to those of skill in the art. In certain aspects, a coating exhibiting chip resistance desirably has a minimum rating of 9 (having not more than one chip to the substrate, EDP, or primer and not more than 2 chips to basecoat, clearcoat, or monocoat).

In other aspects, impact resistance may be tested on a paint coating system on a metal-coated plastic substrate with Izod impact testing (ASTM D256). A 500 g weight may be dropped at 50 cm over the test specimen. Impact resistance can be observed by visual inspection to determine whether any damage has occurred to the painted surface of the metal. In certain test protocol, the impact resistance may optionally include aging. Thus, in certain tests, the sample is initially aged 10 days at about 70° C. followed by freezing for 4 hours at about −30° C. The sample may then be tested by an impact testing method, such as that described in ASTM-D-5420. Desirably, a robust paint coating system on metal-coated plastic substrate has no loss of adhesion and exhibits no lifting or flaking.

In another aspect, the robust paint coating system on metal-coated plastic substrate exhibits abrasion resistance. An abrasion test typically relates to resistance of the coating to wear. For example, a transverse abrasion tester method can be used. Such a test protocol may include 5,000 cycles, 1N load, 100 mm stroke, and 30 cycles per minute. Abrasion resistance is demonstrated where no base surface or undercoat exposure occurs on the coating after being subjected to such a test.

Similarly, in another aspect, the robust paint coating systems on metal-coated plastic substrate desirably exhibits scratch resistance. Scratch resistance may be tested by means of an sclerometer device. For example, an ERICH-SEN™ sclerometer type 318 is equipped with a point of 0.75 mm and is suitable to conduct the test on a coated sample. The appearance of the sample after each applied force is noted. Any marking of less than 2.5 N of applied force is considered not to exhibit sufficient scratch resistance, any marking between 2.5 N and 3 N is sufficient, while it is most desirable to have markings only at applied force of greater than 3 N.

In yet other variations, the robust paint coating systems on metal-coated plastic substrate can exhibit sufficient hardness. Hardness may be tested by a variety of well-known protocols. For example, a Bucholz Hardness indentation hardness test per ISO 2815 can be used to determine the hardness of the coating on the plastic part. The tester acts with force at right angles to the coated specimen, for example, as a force of 5 N for a period of time, usually for about 30 seconds. A reciprocal value of indentation length measured in mm multiplied by 100 is the Bucholz hardness. In certain variations, the Bucholz hardness of the robust paint coating system on metal-coated plastic substrate of the present disclosure is greater than or equal to about 77 and optionally greater than or equal to about 80.

In other aspects, another parameter for the robust paint coating systems on metal-coated plastic substrate exhibits light resistance or resistance to weathering and thermal shock to be suitable for use as exterior parts. For example, a sample can be tested for light resistance by exposure to a Xenon "Weather-o-meter" available from Atlas Electric Co. that contains a cooled xenon arc lamp system to emit radiation onto the sample, such as is detailed in test method SAE-J-2527. In certain aspects, a sample is considered to have light resistance if it exhibits at least 80% gloss retention and has a color delta E ($\Delta E$) of less than 3.0, desirably with no loss of adhesion, cracking, blistering or significant color changes. Another alternative light resistance test may involve, weathering for 96 hours, with exposure to humidity, followed by a tape adhesion test per SAE-J-2527 on the Xenon "Weather-o-meter" device. For example, extended ultraviolent (UV) filters with 2500 kJ/m$^2$ exposure to the exterior Xenon arc lamp may be used. Light resistance is indicated where there is no physical change (e.g., no blistering or discoloration, or adhesion loss) in the coating as compared to a control sample.

Yet another desired parameter for the robust paint coating systems on metal-coated plastic substrate is adequate adhesive strength. The adhesive strength is typically understood to reflect a force required to pull a coating from a substrate. It may be tested for paint-over-metal exterior plastic parts by an adhesion cross hatch test (Test Method A, Cross hatch test or Test Method B, Cross hatch test). In such tests, the surface of the coating is cross-hatched by scoring or scribed to form a grid pattern. Then, a tape having a preselected adhesive strength (e.g., 3M SCOTCH™ brand filament tapes 610, 895 or 898) may be applied to the cross-hatched surface. If any portion of the coating is removed with the tape, the coating would be deemed to have failed the adhesion test and thus has insufficient adhesion strength. Further, it is desirable that no spot pressure marks remain on the surface.

In other aspects, the adhesion test may be conducted during or after exposure to water, for example, in the presence of high levels of moisture or humidity. The surface of the coating may be exposed to relative humidity ranging from 80 to 100% for a long period of time, such as 240 hours at a predetermined temperature like ambient conditions. In another test, exposure may be for 96 hours at 60° C. After the exposure period, a tape having a predetermined adhesive strength is applied (such as the tapes described above). If there is no change in appearance to the surface of the coating after removal of the tape as compared to a control sample (e.g., no blistering or removal), the coating has passed the moisture/adhesion test.

In certain other aspects, the robust paint coating systems on metal-coated plastic substrates exhibit another parameter related to adhesion strength, namely resistance to high pressure cleaning. For example, a polymeric coating on the metal-coated plastic substrate can be subjected to a high pressure jet for a predetermined period of time to determine the robustness of the bond to the underlying substrate. A sample may be subjected to a high pressure cleaning device (a Karcher pressure washer) having a jet, such as having an inclination of 90°, a temperature of 80° C., a distance of about 100 mm, a pressure of about 60 Bar, for a time of about 120 seconds. After subjecting the coating on the sample to the jet wash, resistance is demonstrated by a surface that has a maximum paint removal of less than or equal to about 60 mm$^2$. In certain variations, the surface of the coating after being subjected to the jet wash is not scribed or damaged in any way and does not have any loss of plating or visual deterioration when compared with a control part. In other aspects, the robust paint coating systems on metal-coated plastic substrates demonstrate rubbing resistance or resistance to the action of washing brushes. Often, a sample is subjected to multiple brushing cycles and then residual gloss is measured. Residual gloss D25 1413 (at an angle 20°) is desirably greater than or equal to about 70 UB. Deviation with initial gloss minor is greater than or equal to about 20 UB.

In certain other aspects, the robust paint coating systems on metal-coated plastic substrates exhibit water resistance suitable for use as an exterior component. In certain test protocols, such as ACC D27 1327 a sample is immersed in water for 72 hours at 40° C. A coating that exhibits water resistance exhibits minimal or no color variation and no blistering. Other environmental tests include a simulated aging test, such as a heat age test. In one test protocol, the coated specimen is heated to a predetermined temperature (e.g., 90° C.) for a significant duration (e.g., 500 hours). After such an aging test, a robust paint coating system on metal-coated plastic substrate exhibits minimal or no distortion, stress lines, cracking, crazing, blistering, gloss change, dimensional change or any other detrimental effect when compared with a control specimen (unaged part).

In certain other test protocols, a thermal cycling test may be conducted to determine robustness of the coating over the metal-plated plastic substrate. An exemplary thermal cycling test may include the following sequence, one hour at about 90° C., one hour at about 23° C., one hour at about −40° C., and one hour at about 23° C. A desirable coating does not exhibit plating failure or significant visible surfaces or failure of the plating due to corrosion after completing multiple (e.g., 4) cycles of thermal cycling. Therefore, after such an aging test, a robust paint coating system on metal-coated plastic substrate exhibits minimal or no distortion, stress lines, cracking, crazing, blistering, gloss change, dimensional change or any other detrimental effect when compared with a control specimen (unaged part). In other test protocols, multiple test cycles may be conducted on the coated sample, such as 15.5 hours at about 90° C., followed by 7.5 hours at about −30° C., followed by 15.5 hours at about 49° C. and about 95% relative humidity, followed by 7.5 hours at about −30° C. In certain aspects, a robust paint coating system on metal-coated plastic substrate may exhibit a>about 30 or b>about 30 for color range $\Delta E^*$<about 5, where other color ranges are $\Delta E^*$<about 2.5.

In yet other aspects, the robust paint coating system on a metal-coated plastic substrate desirably demonstrates chemical resistance. In one example, the sample may be tested for chemical resistance via resistance to exposure to acid. In certain test methods, a spot method may be employed, while in other test methods an immersion method may be conducted. A spot method of testing resistance to acid discoloration may involve placing a polyethylene ring (e.g., with a 38-mm inside diameter and 15-mm height) onto the prepared test panel. The ring is tightly pressed against the test panel with a rubber band or other suitable pressing device. 5 mL of $\frac{1}{10}$ N sulfuric acid water solution is dropped into the opening. The opening is covered using a glass or polyethylene or stainless steel plate. The test sample is then left for about 24 hours at about 20±2° C. After the test, the pressing device is removed, the test panel is washed with water, and wiped off. The conditions on the tested portion of the test sample are observed (discoloration, gloss, puckering, cracking, blistering and peeling). The trace of the ring is excluded from the evaluation. The specular gloss is measured (e.g., 60° specular gloss). Colorimetry is also conducted and the color differences are calculated between the tested and untested area of the coating.

In an alternative test method, acid resistance may be tested by immersing the test surface. A prepared test panel can have edges and rear surface sealed with a proper material, if these portions are not coated and the panel is metal before starting the test. $\frac{1}{10}$ N sulfuric acid water solution is poured into a 500-mL beaker, and maintained at about 20±2° C. The specimen is immersed in the solution for a specified duration, then washed with clean running water. The specimen may then be placed upright indoors and left standing for 1 hour. The coated surface is then observed for gloss, discoloration, cracking, blistering, peeling, holes, softening, and the like. A portion of specimen about 6 mm from the edge is excluded from the evaluation. Thus, in either test method, after testing, a coating having desired acid resistance does not lose luster, change color, wrinkle, blister, soften, or peel.

In other aspects, chemical resistance to gasoline is tested by exposing the sample to a volatile solvent composition similar to gasoline. In one test technique, a polyethylene cylinder (e.g., with a 38-mm inner diameter and a height of 15 mm) is placed on the prepared test sample. The cylinder is pressed down with an appropriate compression device to adhere it tightly onto the test sample. 5 mL of a volatile solvent (e.g., a volatile solvent reagent selected from Table 1) is dropped into the opening of the cylinder, then left intact for 3 hours at a temperature of about 20±2° C. If a polyethylene cylinder with a 25-mm inner diameter and a height of 15 mm is used instead, an amount of the volatile solvent applied within the cylinder is reduced by 3 mL for testing.

TABLE 1

| | Solvent | | | | |
| --- | --- | --- | --- | --- | --- |
| | 1 | 2 | 3 | 4 | 5 |
| n-heptane (vol. %) | 50 | 45 | 40 | 30 | 25 |
| n-hexane (vol. %) | 50 | 45 | 40 | 35 | 30 |
| Toluene (vol. %) | 0 | 10 | 10 | 15 | 15 |
| Xylene (vol. %) | 0 | 0 | 5 | 15 | 27 |
| Benzene (vol. %) | 0 | 0 | 5 | 5 | 3 |

After the test, the test panel is dried in the air. Then, any color differences are observed, as well as any crinkling, cracking, blistering, or peeling around the cylinder. A coating that exhibits resistance to such a volatile solvent likewise exhibits resistance to gasoline and preferably has minimal or no color change, puckering, cracking, blistering or peeling.

In other test protocols, chemical resistance is measured by hydrolysis resistance, which can be tested by exposing the sample to about 80% relative humidity for about 96 hours at a temperature of about 80° C. The test conditions are then modified to be about 50% relative humidity at about 23° C. for about 24 hours. The test sample can then be tested by means of an sclerometer ACC D21-3092, using an effort of 10 N. Desirably, the coating having hydrolysis resistance exhibits no tears or any exfoliation from the plated surface.

In yet other aspects, a robust paint coating systems on metal-coated plastic substrate exhibits chemical resistance by being resistant to alkalis. In certain test methods, a spot method is used to test alkali resistance, while in other methods, an immersion method may be conducted to test color resistance to alkalis. In a spot method of testing alkali discoloration resistance, a polyethylene ring (e.g., with 38-mm inside diameter and 15-mm height) is placed onto the test panel. The ring is pressed tightly against the test panel with a rubber band or other suitable pressing device. 5 mL of $\frac{1}{10}$ N sodium hydroxide water solution is dropped into the opening of the ring. The opening of the ring is covered using a glass or polyethylene plate. The sample is left standing for about 4 hours in a thermostatic vessel held at about 55±1° C. After the test, the pressing device is removed, the test panel washed with water, and wiped off. The conditions on the tested portion of the surface are evaluated (e.g., for discoloration, gloss, puckering, cracking, blistering and peeling). The trace of the ring is excluded from the evaluation. The specular gloss can be measured (e.g., 60° specular gloss). Colorimetry is also conducted and the color differences are calculated between the tested and untested area of the coating.

An immersion technique for determining alkali resistance may also be used. A prepared test panel may have the edges and rear surface of the panel sealed with an appropriate material (if the edges and rear surface are not coated and the panel is metal prior to starting the test). $\frac{1}{10}$ N sodium hydroxide water solution is poured into a 500-mL beaker, and maintained at a temperature of about 20±2° C. The specimen is immersed in the solution for a specified duration, then washed with clean running water. The specimen is then placed upright indoors and left standing for about an hour. Then, the surface of the test specimen is observed for gloss, discoloration, cracking, blistering, peeling, holes, softening, and the like. The portion of test specimen about 6 mm from the edge is not subject to evaluation. A coating that exhibits resistance to alkalis has minimal or no loss of luster, color change, wrinkling, blistering, softening, or peeling.

Thus, in certain aspects, a robust, stable multilayer paint-over-metal system on a plastic article having a decorative metallic finish according to certain aspects of the present disclosure exhibits at least one of the following: corrosion resistance, chip resistance, scratch resistance, impact resistance, a Bucholz Hardness of greater than or equal to about 77, light resistance, resistance to weathering and thermal shock, high adhesive strength, resistance to high pressure cleaning, rubbing resistance, resistance to the action of washing brushes, water resistance, resistance to aging, resistance to thermal cycling, chemical resistance, resistance to hydrolysis, acid resistance, gasoline resistance, and alkali resistance. In certain variations, such a robust, stable multilayer paint-over-metal system on a plastic article exhibits at least one of the following sufficient to be employed as an exterior component of a vehicle. In certain other variations, the stable multilayer paint-over-metal system on a plastic article may exhibit multiple of such properties or characteristics. In yet other variations, the robust, stable multilayer paint-over-metal system on a plastic article exhibits all of these properties or characteristics, sufficient to be employed as an exterior component of a vehicle. Furthermore, the multilayer paint-over-metal system on a plastic articles according to certain aspects of the present disclosure are capable of high levels of performance for one or more of these parameters for sustained periods of exposure to environmental conditions, for example, for a service life of an automotive vehicle.

In certain aspects, the present disclosure provides a robust, stable multilayer paint-over-metal system on a plastic article having a decorative metallic finish capable of withstanding harsh environmental conditions. As such, the robust, stable multilayer paint-over-metal systems are particularly suitable for use as vehicle trim, appliances, and other decorative applications. The robust multilayer system comprises a substrate having a metal coating disposed thereon, such as a plated metal layer. In certain aspects, the substrate may be any of the plastics discussed above. Any of the examples of the robust multilayer system components discussed previously above are likewise contemplated as variants in the ensuing discussion.

The metal coating has at least one metal selected from the group consisting of: chromium (Cr), nickel (Ni) and combinations thereof. Such metal coatings may be deposited or applied by any of the techniques discussed above. In certain variations, an organometallic adhesion promoter layer is disposed on the metal-coated substrate. The layer in direct contact with the metal-plated surface of the plastic article contains at least one organometallic adhesion promoter. The organometallic adhesion promoter layer comprises an organofunctional organometallic adhesion promoter compound, which comprises (i) a transition metal selected from the group consisting of: zirconium (Zr), titanium (Ti), chromium (Cr), and combinations thereof, as well as two distinct ligands having two distinct reactive functional groups. The metal coating may comprise chrome (hexavalent or trivalent chromium) and/or nickel. The organometallic adhesion promoter compound further has at least two distinct ligands complexed to the transition metal, although typically, organometallic adhesion promoter comprises four ligands. Notably, certain organometallic adhesion promoters are capable of forming inorganic/organic polymeric networks, which upon reaction or coupling with the metal-plated surface and an overcoat of polymeric paint coating, may have more complex associations with other adjacent organometallic adhesion promoter compounds and thus have more ligands associated or complexed with each transition metal. One non-limiting example is zirconium propionate. The organometallic adhesion promoter complex may be a zirconate, titanate, or chromium-containing compound.

In certain aspects, a first ligand complexed to the transition metal comprises an organofunctional group. In certain variations, the organofunctional group is selected from the group consisting of: amino, glycidyloxy, epoxy, hydroxy, carboxy, allyl, vinyl, acrylate, meth(acrylate), other unsaturated hydrocarbon groups, nitrogen-containing organic groups other than amino groups, halides, epoxides, and combinations thereof. In certain variations, the organometallic adhesion promoter layer in direct contact with the metal-plated surface of the plastic article contains at least one aminofunctional organometallic adhesion promoter.

A second distinct ligand complexed with the transition metal may comprise a metal functional group, which is capable of bonding or associating with the metal-coated layer comprising chromium, nickel, or combinations thereof. Such a functional group may be considered to be a hydrolysable group, such as an alkoxy group. The hydrolysable functional group of the second ligand of the organometallic adhesion promoter is thus capable of reacting with the metal-coated substrate once it is applied. A coupling reaction can take place by displacing a ligand from the organometallic adhesion promoter, such that the transition metal in the organometallic complex will bind to the metal-coated substrate surface.

Next, a precursor of a polymeric paint coating is applied over the organometallic adhesion promoter layer. Organic paint precursor materials are applied over the organometallic adhesion promoter layer. The paint precursor material includes one or more polymers or prepolymers, such as monomers or oligomers, which are capable of forming a film or polymeric paint coating. The one or more precursor materials may be further dried, cured, cross-linked, and/or coalesced after application to the organometallic adhesion promoter layer to form a continuous paint coating. The organofunctional group of the first ligand of the organometallic adhesion promoter layer reacts with at least a portion of the organic paint precursor material to form a robust polymeric paint coating, which in certain variations is transparent. The organic paint precursor materials may include solvent-borne or waterborne polymeric layers, as are well known in the art. Furthermore, organic polymeric paint coatings are often applied as two-part systems including one or more precursor materials that serve as a primer coating and one or more precursor materials that serve as the topcoat of paint.

In certain aspects, the robust, stable polymeric paint coating formed by applying paint precursor materials is transparent so that at least a portion of the underlying metal coating is visible. Although in certain variations, the polymeric paint coating composition may have one or more opaque regions. Thus, the one or more organic precursors may include pigments, colorants or dyes, as are well known in the art. Tinted organic paint coatings may be used to permit bright, lustrous chrome surfaces to be visible, while imparting a color or tint to the chrome surface. In addition to decorative applications, the robust, stable polymeric paint coatings may be used as functional coatings, such as protective scratch-resistant or ultra-violet radiation resistant coatings, over chrome or other metal-coated surfaces. As noted previously, any of the layers of metal, adhesion promoter or organic polymeric paint may comprise multiple layers. Moreover, each respective layer may have the same composition or may be distinct from one another.

In alternative variations, a multilayer paint-over-metal system decorative finish is provided for automotive trim and other decorative applications. In certain aspects, the multilayer system comprises a substrate having a metal coating disposed thereon, such as a plated metal layer. In certain aspects, the substrate may be any of the plastics discussed above. Similarly, any of the examples of the robust multilayer system components discussed previously above are likewise contemplated as variations for the embodiments discussed herein. The metal coating has at least one metal selected from the group consisting of: chromium (Cr), nickel (Ni) and combinations thereof. Such metal coatings may be deposited or applied by any of the techniques discussed above.

In certain variations, the organometallic adhesion promoter may be directly introduced into one or more organic paint precursor materials that form a layer of the polymeric paint coating applied to the metal-coated surface primer layer. In such embodiments, the organometallic adhesion promoter layer may be omitted altogether. It is noted, however, that in certain circumstances it is preferred to have a distinct organometallic adhesion promoter layer between the metal and organic polymeric paint coating. Thus, in certain aspects, a sealer composition or a primer solution optionally contains one or more organofunctional organometallic adhesion promoter to increase adhesion of organic polymeric paint coating to the metal-plated plastic substrate. In other variations, an organic clearcoat or a topcoat of paint comprises at least one organofunctional organometallic adhesion promoter, which increases adhesion of organic polymeric paint coatings to the metal-plated plastic substrate.

Thus, a robust organic polymeric paint coating is applied directly over the metal-coated substrate. At least one of the layers of the organic polymeric paint coating comprises the organometallic adhesion promoter. Thus, the organometallic adhesion promoter can be added to one or more precursor materials, which may be further dried, cured, cross-linked, and/or coalesced after application to the metal coating over the plastic substrate to form a continuous paint coating. The organofunctional group of the first ligand of the organometallic adhesion promoter reacts with at least a portion of the organic paint precursor materials, while the metal functional, hydrolysable group is reacted with the metal coating, forming a more stable and robust polymeric paint coating over the metal coating comprising Cr, Ni, or combinations thereof.

The decorative components according to certain aspects of the present teachings thus eliminate certain potential issues that may occur with conventional formation processes, for example, to minimizing or eliminating delamination issues altogether, by avoiding direct painting over a metallic surface finish. Furthermore, some additional non-limiting benefits of the organometallic adhesion promoters include increasing bond strength and adhesion of paint to metal-plated plastic surfaces that provides increased stone chip resistance, a major weaknesses of current paint over chrome processes. Additionally, the robust transparent polymeric paint coating systems according to the present teachings are cost competitive, as compared to other silane-based adhesion promoters for paint to metal, but significantly more environmentally friendly than silane-based adhesion promoters.

Specifically disclosed are embodiments of the present disclosure, including methods for forming a robust polymeric paint coating on a metal-coated substrate. The method optionally comprises applying an organometallic adhesion promoter to a surface of the metal-coated substrate. The metal-coated substrate comprises a first metal selected from the group consisting of: chromium (Cr), nickel (Ni) and combinations thereof. In certain variations, the first metal of the metal-coated substrate is selected from the group consisting of: trivalent chromium (Cr(III)), hexavalent chromium (Cr(VI)), and combinations thereof.

The organometallic adhesion promoter applied over the metal-coated substrate comprises (i) a second metal selected from the group consisting of: zirconium (Zr), titanium (Ti), chromium (Cr), and combinations thereof, (ii) a first ligand complexed to the metal comprising an organofunctional group, and (iii) a second ligand complexed to the metal having a hydrolysable functional group. The method further comprises applying an organic paint precursor material over the organometallic adhesion promoter. In certain aspects, the method may further comprise curing or cross-linking the one or more layers of organic precursor material to form the robust polymeric paint coating on the substrate. After application of the organic paint precursor material, the hydrolysable functional group of the second ligand of the organometallic adhesion promoter is capable of reacting with the metal-coated substrate, while the organofunctional group of the first ligand reacts with at least a portion of the organic paint precursor material to form a robust polymeric paint coating. The robust polymeric paint coating over the metal-coated substrate may be used as a decorative component.

In certain variations, the organofunctional group of the first ligand of the organometallic adhesion promoter is selected from the group consisting of: amino, glycidoxy, epoxy, hydroxy, carboxy, allyl, vinyl, acrylate, meth(acrylate), other unsaturated hydrocarbon groups, nitrogen-containing organic groups, halides, epoxides, and combinations thereof. In certain other variations, the organofunctional group of the first ligand of the organometallic adhesion promoter is selected from the group consisting of: amino, glycidoxy, epoxy, hydroxy, carboxy, allyl, vinyl, acrylate, meth(acrylate), and combinations thereof. In certain variations, the organofunctional group of the first ligand is an amino group.

In certain variations, the hydrolysable functional group of the second ligand of the organometallic adhesion promoter comprises an alkoxy, an aryloxy, or a carboxy group. In certain other variations, the hydrolysable functional group of the second ligand of the organometallic adhesion promoter comprises an alkoxy group.

In certain variations, the organometallic adhesion promoter has an organofunctional group comprising an amino group, a hydrolysable functional group on the second ligand that comprises an alkoxy, and the second transition metal comprises titanium (Ti) or zirconium (Zr). In certain aspects, the organometallic adhesion promoter is optionally represented by the general formula (I):

$(R^1)_n\text{-}M(R^2)_a(R^3)_b(R^4)_c$        (I), where M is selected from Ti, Zr, and Cr, $R^1$ is represented by —O—Y, where Y may be a straight or branched alkyl, alkenyl, cycloalkyl, or aryl group having 1 to 30 carbon atoms, wherein $R^2$, $R^3$, and $R^4$ are hydrocarbyl ligands having 1 to 30 carbon atoms, wherein at least one of $R^2$, $R^3$, and $R^4$ comprises an organofunctional group, and a sum of n+a+b+c=4. In certain aspects, the $R^2$ ligand may comprise an amino organofunctional group and is selected from the group consisting of: —O—$(CH_2)_y NH_2$, —$(CH_2)_y NH_2$, —O—$(CH_2)_y NRR'$, —$(CH_2)_y NRR'$, —O—R"$NH_2$, —R"$NH_2$, —O—R"NRR', and —R"NRR', where y is 1 to 30, and R, R', and R" are straight or branched alkyl groups having 1 to 30 carbon atoms.

In certain variations, the organometallic adhesion promoter is selected from the group consisting of: neoalkoxytris (m-aminophenyl) zirconate, neoalkoxytris(ethylenediaminoethyl) zirconate, neoalkoxytrisneodecanoyl zirconate, neoalkoxytris(dodecanoyl)benzene sulfonyl zirconate, neoalkoxytris(dodecyl)benzenesulfonyl zirconate, zirconium propionate, neoalkoxytris(dioctyl)phosphate zirconate, neoalkoxytris(dioctyl)pyrophosphate zirconate, tris(dioctylpyrophosphate)ethylene titanate, tetra(2,2-diallyloxymethyl)butyl, bis(ditridecyl)phosphito zirconate, neopentyl(diallyl)oxytrisneodecanoyl zirconate, neopentyl (diallyl)oxytris(dodecyl)benzenesulfonyl zirconate, neopentyl(diallyl)oxytris(dioctyl)phosphate zirconate, neopentyl (diallyl)oxytris(dioctyl)pyrophosphate zirconate, tris (dioctylpyrophosphate)ethylene titanate, neopentyl(diallyl) oxytris(N-ethylenediamino)ethyl zirconate, neopentyl (diallyl)oxytris(m-amino)phenyl zirconate, neopentyl (diallyl)oxytrismethacryl zirconate, neopentyl(diallyl) oxytrisacryl zirconate, dineopentyl(diallyl)oxydiparamino benzoyl zirconate, dineopentyl(aiallyl)oxy bis(3-mercapto) propionic zirconate, zirconium IV 2-ethyl, and 2-propenolatomethyl 1,3-propanediolato, cyclo di2,2-(bis 2-propenolatomethyl)butanolato pyrophosphato-O,O,tetra(2,2 diallyloxymethyl)butyl, neopentyl(diallyl)oxy, trimethacryl zirconate, methacryloxy aluminozirconate, isopropyl tris(N-ethylaminoethylamino)titanate, isopropyl triisostearoyl titanate, titanium bis(dioctylpyrophosphate)oxy acetate, tetraisopropyl bis(dioctylphosphito)titanate, neoalkoxytri[p-N-(β-aminoethyl)amino phenyl]titanate, isopropyl trioctanoyl titanate, isopropyl diisostearoylcumylphenyl titanate, isopropyl tricumylphenyl titanate, isopropyl distearoylmethacryl titanate, isopropyl diniethacrylisostearoyl titanate, isopropyl tris(dodecylbenzenesulfonyl)titanate, isopropyl diisostearoylacryl titanate, isopropyl diisostearoylacryl titanate, isopropyl isostearoyldiacryl titanate, isopropyl isostearoyldiacryl titanate, isopropyl tris(dioctylphosphate) titanate, isopropyl tri-n-stearoyl titanate, isopropyl 4-aminobenzenesulfonyl-bis(dodecylbenzenesulfonyl)titanate, isopropyl trimethacryl titanate, isopropyl trimethacrylonitrile titanate, isopropyl bis(4-aminobenzoyl)isostearoyl titanate, isopropyl tris(dioctylpyrophosphate)titanate, tris(dioctylpyrophosphate)ethylene titanate, isopropyl triacryl titanate, isopropyl tris(N,N-dimethyl-ethylamino)titanate, isopropyl tris(N-ethylamino-ethylamino)titanate, isopropyl triacryl titanate, isopropyl tris(N,N-dimethyl-ethylamino)titanate, isopropyl tris(N-ethylamino-ethylamino)titanate, isopropyl trianthranyl titanate, isopropyl tris(octylbutylpyrophosphate)titanate, and isopropyl tris(butylmethylpyrophosphate)titanate, octylene glycol titanate, (tetrakis) 2-ethylhexane-1, 3-(diolato)titanate, tetrakis(biethylamido)titanate, tetraisopropylbis(dioctylphosphite)titanate, tetraoctylbis (ditridecylphosphite)titanate, tetra(2,2-diallyloxymethyl-1-butyl)bis(ditridecyl)phosphite titanate, diisostearoyl oxyacetatetitanate, isostearoyl methacryloxyacetatetitanate, isostearoyl acryloxyacetatetitanate, bis(dioctylphosphate) oxyacetatetitanate, 4-amino benzenesulfonyldodecylbenzene sulfonyloxyacetatetitanate, dimethacryloxyacetatetitanate, dicumylphenolateoxyacetate titanate, 4-aminobenzoylisostearoyloxyacetate titanate, bis(dioctylpyrophosphate)oxyacetate titanate, diacryloxyacetate titanate, bis(octylbutylpyrophosphate)oxyacetate titanate, diisostearoylethylene titanate, isostearoylmethacrylethylene titanate, bis(dioctylphosphate)ethylene titanate, 4-aminobenzenesulfonyldodecylbenzenesulfonylethylene titanate, dimethacrylethylene titanate, 4-aminobenzenesulfonylisostearoylethylene titanate, bis(dioctylpyrophosphate) ethylene titanate, diacrylethylene titanate, dianthranylethylenetitanate, bis(butylmethylpyrophosphate)ethylene titanate, and combinations thereof.

In certain other aspects, the substrate of the decorative component is a plastic substrate, which comprises a polymer selected from the group consisting of: acrylonitrile butadiene styrene (ABS), acrylonitrile butadiene styrene/polycarbonate (ABS/PC), polycarbonate (PC), polyamide (PA), polypropylene (PP), polyolefins, thermoplastic olefins (TPOs), polyphenyleneoxide (PPO), polyphenylene ether, polyimides, polyether imide (PEI), polyether ether ketone (PEEK), polyphenylene sulfide, polyphthalamide, polyurethane (PU), polybutylene terephthalate (PBT), polycarbonate/polybutylene terephthalate (PC/PBT), polyacrylates, polyesters, polyethers, polyketones, copolymers, and combinations thereof.

In certain variations, the organic paint precursor material is a precursor of a polymeric material selected from the group consisting of: acrylic polymers, methacrylic polymers, styrenated acrylic polymers, epoxy polymers, polyurethane polymers, polyester polymers, polyvinyl ester polymers, polyvinylidene halide polymers, alkyd derived components, co-polymers, derivatives, and combinations thereof. In certain aspects, the organic paint precursor material comprises multiple layers of solvent-borne or water-borne polymeric layers applied over the organometallic adhesion promoter. The organic paint precursor material optionally comprises at least one colorant, such as a dye, pigment, or the like. The organic paint formed from the precursor material may be partially or fully transparent. In certain variations, the organic paint precursor material adjacent to the organometallic adhesion promoter is a paint primer. In certain variations, a preferred paint system composition comprises one or more polymers selected from the group consisting of: methacrylates, acrylates, styrene, and combinations or derivatives thereof. The applying of the organic paint precursor material may comprise first applying at least one layer of a paint primer over the applied organometallic adhesion promoter and then applying at least one layer of a precursor of a paint coating over the paint primer layer.

In certain other aspects, a method for forming a robust polymeric paint coating on a metal-coated substrate of a decorative component is provided. The method optionally comprises forming a metal coating on a plastic substrate. The metal coating comprises a first metal selected from the group consisting of chromium, nickel, and combinations thereof. The method further comprises applying an organometallic adhesion promoter over the chromium-containing metal coating.

The organometallic adhesion promoter comprises (i) a transition metal selected from the group consisting of: zirconium (Zr), titanium (Ti), chromium (Cr), and combinations thereof, (ii) a first ligand complexed to the metal comprising an organofunctional group selected from the group consisting of: amino, such as a primary amine ($NH_2$), a secondary amine (NH), hydroxy, carboxy, unsaturated functionalities, including allyl, vinyl, epoxy, glycidyloxy, acrylate, meth(acrylate), and combinations thereof. A second ligand complexed to the transition metal has an alkoxy group. In certain variations, the organofunctional group of the first ligand is an amino group. The one or more layers of an organic paint precursor material are thus applied over the organometallic adhesion promoter. The hydrolysable alkoxy functional group of the second ligand of the organometallic adhesion promoter is capable of reacting with the metal-coated substrate. Furthermore, the organofunctional group of the first ligand reacts with at least a portion of the organic paint precursor material to form a robust polymeric paint coating on the decorative component. In certain aspects, the method may further comprise curing or cross-linking the one or more layers of organic precursor material to form the robust polymeric paint coating on the decorative component.

Further, the forming of the metal coating includes at least one plating process selected from the group consisting of: an electroless bath, an electroplating bath, and combinations thereof. In certain variations, before the forming of the metal coating, a surface of the plastic substrate is etched with an etching solution comprising chromium and sulfuric acid. This is followed by depositing the first metal coating via an electroless plating process to deposit at least one metal selected from the group consisting of: nickel (Ni), copper (Cu), and combinations thereof. Afterwards, a first electroplating process forms at least one copper (Cu) layer thereon, followed by a second electroplating process to form at least one nickel (Ni) layer, and a third electroplating process to form at least one chromium (Cr) layer. The at least one chromium layer thus is directly adjacent to the subsequently applied organometallic adhesion promoter and thus reactive with it.

In certain variations, the organometallic adhesion promoter has an organofunctional group comprising an amino group, a hydrolysable functional group on the second ligand that comprises an alkoxy, and the second transition metal comprises titanium (Ti) or zirconium (Zr). In certain aspects, the organometallic adhesion promoter is optionally represented by the general formula (I):

$$(R^1)_n\text{-}M(R^2)_a(R^3)_b(R^4)_c \qquad (I),$$

where M is selected from Ti, Zr, and Cr, $R^1$ is represented by —O—Y, where Y may be a straight or branched alkyl or alkenyl group having 1 to 30 carbon atoms, wherein $R^2$, $R^3$, and $R^4$ are hydrocarbyl ligands having 1 to 30 carbon atoms, wherein at least one of $R^2$, $R^3$, and $R^4$ comprises the organofunctional group, and a sum of n+a+b+c=4. In certain aspects, the $R^2$ ligand may comprise an amino organofunctional group and is selected from the group consisting of: —O—$(CH_2)_y$$NH_2$, —$(CH_2)_y$$NH_2$, —O—$(CH_2)_y$NRR', —$(CH_2)_y$NRR', —O—R"$NH_2$, —R"$NH_2$, —O—R"NRR', and —R"NRR', where y is 1 to 30, and R, R', and R" are straight or branched alkyl groups having 1 to 30 carbon atoms.

In certain other aspects, the substrate of the decorative component is a plastic substrate, which comprises a polymer selected from the group consisting of: acrylonitrile butadiene styrene (ABS), acrylonitrile butadiene styrene/polycarbonate (ABS/PC), polycarbonate (PC), polyamide (PA), polypropylene (PP), polyolefins, thermoplastic olefins (TPOs), polyphenyleneoxide (PPO), polyphenylene ether, polyimides, polyether imide (PEI), polyether ether ketone (PEEK), polyphenylene sulfide, polyphthalamide, polyurethane (PU), polybutylene terephthalate (PBT), polycarbonate/polybutylene terephthalate (PC/PBT), polyacrylates, polyesters, polyethers, polyketones, copolymers, and combinations thereof.

In certain other aspects, the organic paint precursor material is a precursor of a polymeric material selected from the group consisting of: acrylic polymers, methacrylic polymers, styrenated acrylic polymers, epoxy polymers, polyurethane polymers, polyester polymers, polyvinyl ester polymers, polyvinylidene halide polymers, alkyd derived components, co-polymers, derivatives, and combinations thereof. In certain aspects, the organic paint precursor material comprises multiple layers of solvent-borne or water-borne polymeric layers applied over the organometallic adhesion promoter. The organic paint precursor material optionally comprises at least one colorant, such as a dye, pigment, or the like. The organic paint formed from the precursor material may be semi-transparent or fully transparent. In certain variations, the organic paint precursor material adjacent to the organometallic adhesion promoter is a paint primer. In certain variations, a suitable paint system composition comprises one or more polymers selected from the group consisting of: methacrylates, acrylates, styrene, and combinations or derivatives thereof. The applying of the organic paint precursor material may thus comprise first applying at least one layer of a paint primer over the applied organometallic adhesion promoter and then applying at least one layer of a precursor of a paint coating over the primer layer.

In yet other aspects, the present disclosure provides methods for forming a robust transparent polymeric paint coating (e.g., semi-transparent or fully transparent paint) on a chromium-containing metal coated substrate. The method comprises forming a chromium-containing metal coating on a plastic substrate. The chromium-containing metal coating comprises trivalent chromium (Cr(III)), hexavalent chromium (Cr(VI)), and combinations thereof. An organometallic adhesion promoter is applied over the chromium-containing metal coating. The organometallic adhesion promoter comprises (i) a transition metal selected from the group consisting of: zirconium (Zr), titanium (Ti), chromium (Cr), and combinations thereof, (ii) a first ligand complexed to the metal comprising an organofunctional group, and (iii) a second ligand complexed to the metal having a hydrolysable functional group, such as an alkoxy.

One or more layers of an organic paint precursor material are applied over the organometallic adhesion promoter. The precursor material is optionally selected from the group consisting of: acrylic polymers, methacrylic polymers, styrenated acrylic polymers, epoxy polymers, polyurethane polymers, polyester polymers, polyvinyl ester polymers, polyvinylidene halide polymers, alkyd derived components, co-polymers, derivatives, and combinations thereof. In certain variations, a particularly suitable paint system composition comprises one or more polymers selected from the group consisting of: methacrylates, acrylates, styrene, and combinations or derivatives thereof. Furthermore, the alkoxy group of the second ligand of the organometallic adhesion promoter is capable of reacting with the chromium-containing metal coating on the substrate, while the organofunctional group of the first ligand reacts with at least a portion of the organic paint precursor material to form a robust transparent polymeric paint coating.

In certain variations, the forming of the chromium-containing metal coating includes at least one plating process selected from the group consisting of: an electroless bath, an electroplating bath, and combinations thereof. In certain variations, before the forming of the chromium-containing metal coating, a surface of the plastic substrate is etched with an etching solution comprising chromium and sulfuric acid. This is followed by depositing the first metal coating via an electroless plating process to deposit at least one metal selected from the group consisting of: nickel (Ni), copper (Cu), and combinations thereof. Afterwards, a first electroplating process forms at least one copper (Cu) layer thereon, followed by a second electroplating process to form at least one nickel (Ni) layer, and a third electroplating process to form at least one chromium (Cr) layer. The chromium layer thus is directly adjacent to the subsequently applied organometallic adhesion promoter and thus reactive with the organometallic adhesion promoter.

In certain variations, the organometallic adhesion promoter has an organofunctional group comprising an amino group, a hydrolysable functional group on the second ligand that comprises an alkoxy, and the second transition metal comprises titanium (Ti) or zirconium (Zr). In certain aspects, the organometallic adhesion promoter is optionally represented by the general formula (I):

$$(R^1)_n\text{-}M(R^2)_a(R^3)_b(R^4)_c \qquad (I),$$

where M is selected from Ti, Zr, and Cr, $R^1$ is represented by —O—Y, where Y may be a straight or branched alkyl or alkenyl group having 1 to 30 carbon atoms, wherein $R^2$, $R^3$, and $R^4$ are hydrocarbyl ligands having 1 to 30 carbon atoms, wherein at least one of $R^2$, $R^3$, and $R^4$ comprises an organofunctional group, and a sum of n+a+b+c=4. In certain aspects, the $R^2$ ligand may comprise an amino organofunctional group and is selected from the group consisting of: —O—$(CH_2)_y NH_2$, —$(CH_2)_y NH_2$, —O—$(CH_2)_y$NRR', —$(CH_2)_y$NRR', —O—R"$NH_2$, —R"$NH_2$, —O—R"NRR', and —R"NRR', where y is 1 to 30, and R, R', and R" are straight or branched alkyl groups having 1 to 30 carbon atoms.

In certain other aspects, the substrate of the decorative component is a plastic substrate, which comprises a polymer selected from the group consisting of: acrylonitrile butadiene styrene (ABS), acrylonitrile butadiene styrene/polycarbonate (ABS/PC), polycarbonate (PC), polyamide (PA), polypropylene (PP), polyolefins, thermoplastic olefins (TPOs), polyphenyleneoxide (PPO), polyphenylene ether, polyimides, polyether imide (PEI), polyether ether ketone (PEEK), polyphenylene sulfide, polyphthalamide, polyurethane (PU), polybutylene terephthalate (PBT), polycarbonate/polybutylene terephthalate (PC/PBT), polyacrylates, polyesters, polyethers, polyketones, copolymers, and combinations thereof.

In certain aspects, the organic paint precursor material comprises multiple layers of solvent-borne or waterborne polymeric layers applied over the organometallic adhesion promoter. The transparent organic paint formed from the precursor material may be semi-transparent or fully transparent. The transparent organic paint precursor material optionally comprises at least one colorant, such as a dye, pigment, or the like. In certain variations, the organic paint precursor material adjacent to the organometallic adhesion promoter is a paint primer. The applying of the organic paint precursor material may thus comprise first applying at least one layer of a paint primer over the applied organometallic adhesion promoter and then applying at least one layer of a precursor of a paint coating over the paint primer layer.

In yet other variations, a robust transparent polymeric paint coating on a metal-coated plastic substrate of a decorative component comprises a metal coating on a plastic substrate. The metal coating comprises a first metal selected from chromium (Cr), nickel (Ni), combinations and alloys thereof. An organometallic adhesion promoter layer disposed over the chromium-containing metal coating. The organometallic adhesion promoter comprises (i) a transition metal selected from the group consisting of: zirconium (Zr), titanium (Ti), chromium (Cr), and combinations thereof, (ii) a first ligand complexed to the metal comprising an organofunctional group, and (iii) a second ligand complexed to the metal having a hydrolysable functional group selected from the group consisting of: an alkoxy group, an aryloxy group, and a carboxy group.

The robust transparent polymeric paint coating also comprises one or more layers of a polymeric paint coating disposed over the organometallic adhesion promoter. The hydrolysable functional group of the second ligand of the organometallic adhesion promoter is capable of reacting with the metal coating, while the organofunctional group of the first ligand reacts with at least a portion of the polymeric paint coating to form a robust bond between the polymeric paint coating and the metal-coated plastic substrate.

In certain variations, the first metal of the metal-coated substrate is selected from the group consisting of: trivalent chromium (Cr(III)), hexavalent chromium (Cr(VI)), and combinations thereof. In certain aspects, the metal coating comprises trivalent chromium (Cr(III)) or hexavalent chromium (Cr(VI)). In certain other variations, the hydrolysable functional group of the second ligand of the organometallic adhesion promoter comprises an alkoxy group.

In other variations, the organofunctional group of the first ligand of the organometallic adhesion promoter is selected from the group consisting of: amino, glycidoxy, epoxy, hydroxy, carboxy, allyl, vinyl, acrylate, meth(acrylate), other unsaturated hydrocarbon groups, nitrogen-containing organic groups, halides, epoxides, and combinations thereof. In certain other variations, the organofunctional group of the first ligand of the organometallic adhesion promoter is selected from the group consisting of: amino, glycidoxy, epoxy, hydroxy, carboxy, allyl, vinyl, acrylate, meth(acrylate), and combinations thereof. In certain variations, the organofunctional group of the first ligand is an amino group.

In certain variations, the organometallic adhesion promoter has an organofunctional group comprising an amino group, a hydrolysable functional group on the second ligand that comprises an alkoxy, and the second transition metal comprises titanium (Ti) or zirconium (Zr). In certain aspects, the organometallic adhesion promoter is optionally represented by the general formula (I):

$(R^1)_n$-M$(R^2)_a(R^3)_b(R^4)_c$ (I), where M is selected from Ti, Zr, and Cr, $R^1$ is represented by —O—Y, where Y may be a straight or branched alkyl, alkenyl, cycloalkyl, or aryl group having 1 to 30 carbon atoms, wherein $R^2$, $R^3$, and $R^4$ are hydrocarbyl ligands having 1 to 30 carbon atoms, wherein at least one of $R^2$, $R^3$, and $R^4$ comprises an organofunctional group, and a sum of n+a+b+c=4. In certain aspects, the $R^2$ ligand may comprise an amino organofunctional group and is selected from the group consisting of: —O—$(CH_2)_y NH_2$, —$(CH_2)_y NH_2$, —O—$(CH_2)_y$NRR', —$(CH_2)_y$NRR', —O—R"$NH_2$, —R"$NH_2$, —O—R"NRR', and —R"NRR', where y is 1 to 30, and R, R', and R" are straight or branched alkyl groups having 1 to 30 carbon atoms.

In certain variations, the organometallic adhesion promoter is selected from the group consisting of: neoalkoxytris(m-aminophenyl) zirconate, neoalkoxytris(ethylenediaminoethyl) zirconate, neoalkoxytrisneodecanoyl zirconate, neoalkoxytris(dodecanoyl)benzene sulfonyl zirconate, neoalkoxytris(dodecyl)benzenesulfonyl zirconate, zirconium propionate, neoalkoxytris(dioctyl)phosphate zirconate, neoalkoxytris(dioctyl)pyrophosphate zirconate, tris(dioctylpyrophosphate)ethylene titanate, tetra(2,2-diallyloxymethyl)butyl, bis(ditridecyl)phosphito zirconate, neopentyl(diallyl)oxytrisneodecanoyl zirconate, neopentyl(diallyl)oxytris(dodecyl)benzenesulfonyl zirconate, neopentyl(diallyl)oxytris(dioctyl)phosphate zirconate, neopentyl(diallyl)oxytris(dioctyl)pyrophosphate zirconate, tris(dioctylpyrophosphate)ethylene titanate, neopentyl(diallyl)oxytris(N-ethylenediamino)ethyl zirconate, neopentyl(diallyl)oxytris(m-amino)phenyl zirconate, neopentyl(diallyl)oxytrismethacryl zirconate, neopentyl(diallyl)oxytrisacryl zirconate, dineopentyl(diallyl)oxydiparamino benzoyl zirconate, dineopentyl(aiallyl)oxy bis(3-mercapto) propionic zirconate, zirconium IV 2-ethyl, and 2-propenolatomethyl 1,3-propanediolato, cyclo di2,2-(bis 2-propenolatomethyl)butanolato pyrophosphato-O,O,tetra(2,2 diallyloxymethyl)butyl, neopentyl(diallyl)oxy, trimethacryl zirconate, methacryloxy aluminozirconate, isopropyl tris(N-ethylaminoethylamino)titanate, isopropyl triisostearoyl titanate, titanium bis(dioctylpyrophosphate)oxy acetate, tetraisopropyl bis(dioctylphosphito)titanate, neoalkoxytri[p-N-(β-aminoethyl)amino phenyl]titanate, isopropyl trioctanoyl titanate, isopropyl diisostearoylcumylphenyl titanate, isopropyl tricumylphenyl titanate, isopropyl distearoylmethacryl titanate, isopropyl diethacrylisostearoyl titanate, isopropyl tris(dodecylbenzenesulfonyl)titanate, isopropyl diisostearoylacryl titanate, isopropyl diisostearoylacryl titanate, isopropyl isostearoyldiacryl titanate, isopropyl isostearoyldiacryl titanate, isopropyl tris(dioctylphosphate) titanate, isopropyl tri-n-stearoyl titanate, isopropyl 4-aminobenzenesulfonyl-bis(dodecylbenzenesulfonyl)titanate, isopropyl trimethacryl titanate, isopropyl trimethacrylonitrile titanate, isopropyl bis(4-aminobenzoyl)isostearoyl titanate, isopropyl tris(dioctylpyrophosphate)titanate, tris(dioctylpyrophosphate)ethylene titanate, isopropyl triacryl titanate, isopropyl tris(N,N-dimethyl-ethylamino)titanate, isopropyl tris(N-ethylamino-ethylamino)titanate, isopropyl triacryl titanate, isopropyl tris(N,N-dimethyl-ethylamino)titanate, isopropyl tris(N-ethylamino-ethylamino) titanate, isopropyl trianthranyl titanate, isopropyl tris(octylbutylpyrophosphate)titanate, and isopropyl tris(butylmethylpyrophosphate)titanate, octylene glycol titanate, (tetrakis) 2-ethylhexane-1, 3-(diolato)titanate, tetrakis(biethylamido)titanate, tetraisopropylbis(dioctylphosphite)titanate, tetraoctylbis (ditridecylphosphite)titanate, tetra(2,2-diallyloxymethyl-1-butyl)bis(ditridecyl)phosphite titanate, diisostearoyl oxacetatetitanate, isostearoyl methacryloxyacetatetitanate, isostearoyl acryloxyacetatetitanate, bis(dioctylphosphate) oxyacetatetitanate, 4-amino benzenesulfonyldodecylbenzene sulfonyloxyacetatetitanate, dimethacryloxyacetatetitanate, dicumylphenolateoxyacetate titanate, 4-aminobenzoylisostearoyloxyacetate titanate, bis(dioctylpyrophosphate)oxyacetate titanate, diacryloxyacetate titanate, bis(octylbutylpyrophosphate)oxyacetate titanate, diisostearoylethylene titanate, isostearoylmethacrylethylene titanate, bis(dioctylphosphate)ethylene titanate, 4-aminobenzenesulfonyldodecylbenzenesulfonylethylene titanate, dimethacrylethylene titanate, 4-aminobenzenesulfonylisostearoylethylene titanate, bis(dioctylpyrophosphate) ethylene titanate, diacrylethylene titanate, dianthranylethylenetitanate, bis(butylmethylpyrophosphate)ethylene titanate, and combinations thereof.

In certain other aspects, the plastic substrates of the decorative component comprises a polymer selected from the group consisting of: acrylonitrile butadiene styrene (ABS), acrylonitrile butadiene styrene/polycarbonate (ABS/PC), polycarbonate (PC), polyamide (PA), polypropylene (PP), polyolefins, thermoplastic olefins (TPOs), polyphenyleneoxide (PPO), polyphenylene ether, polyimides, polyether imide (PEI), polyether ether ketone (PEEK), polyphenylene sulfide, polyphthalamide, polyurethane (PU), polybutylene terephthalate (PBT), polycarbonate/polybutylene terephthalate (PC/PBT), polyacrylates, polyesters, polyethers, polyketones, copolymers, and combinations thereof.

In certain variations, the polymeric paint coating comprises one or more polymeric materials selected from the group consisting of: acrylic polymers, methacrylic polymers, styrenated acrylic polymers, epoxy polymers, polyurethane polymers, polyester polymers, polyvinyl ester polymers, polyvinylidene halide polymers, alkyd derived components, co-polymers, derivatives, and combinations thereof. In certain aspects, the organic paint coating comprises multiple layers of solvent-borne or waterborne polymeric layers disposed over the organometallic adhesion promoter. The organic paint coating optionally comprises at least one colorant, such as a dye, pigment, or the like. The polymeric paint may be partially or fully transparent. In certain variations, the polymeric paint coating comprises multiple layers, including a paint primer, so that the paint primer layer is adjacent to the organometallic adhesion promoter layer.

As mentioned, all possible combinations of the enumerated optional features of these processes for forming robust organic paint coatings over metal-coated plastic substrates and the materials formed therefrom are specifically disclosed as embodiments. The details, examples and preferences provided above in relation to any particular one or more of the stated aspects or features of the present technology, and described and exemplified above in relation to any particular one or more of the stated aspects or features of the present technology, apply equally to all aspects of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a robust polymeric paint coating on a metal-coated substrate, the method comprising:
applying an organometallic adhesion promoter directly to a surface of the metal-coated substrate that comprises a first metal selected from the group consisting of: chromium (Cr), nickel (Ni), combinations and alloys thereof, wherein the organometallic adhesion promoter comprises (i) a second metal selected from the group consisting of: zirconium (Zr), titanium (Ti), chromium (Cr), and combinations thereof, (ii) a first ligand complexed to the second metal comprising an organofunctional group, and (iii) a second ligand complexed to the second metal having a hydrolysable functional group, so that the hydrolysable functional group of the second ligand of the organometallic adhesion promoter reacts with the metal-coated substrate; and
applying an organic paint precursor material over the organometallic adhesion promoter, so that the organofunctional group of the first ligand reacts with at least a portion of the organic paint precursor material to form the robust polymeric paint coating.

2. The method of claim 1, wherein the organofunctional group of the first ligand is selected from the group consisting of: amino, glycidoxy, epoxy, hydroxy, carboxy, allyl, vinyl, acrylate, meth(acrylate), unsaturated hydrocarbon groups, nitrogen-containing organic groups, halides, epoxides, and combinations thereof, and the hydrolysable functional group of the second ligand is selected from the group consisting of: an alkoxy group, an aryloxy group, and a carboxy group.

3. The method of claim 1, wherein the organofunctional group of the first ligand is selected from the group consisting of: amino, glycidyloxy, epoxy, hydroxy, carboxy, allyl, vinyl, acrylate, meth(acrylate), and combinations thereof.

4. The method of claim 1, wherein the organofunctional group of the first ligand comprises an amino group, the hydrolysable functional group of the second ligand comprises an alkoxy, and the second metal comprises titanium (Ti) or zirconium (Zr).

5. The method of claim 1, wherein the organometallic adhesion promoter is represented by the general formula (I):

$$(R^1)_n\text{-}M(R^2)_a(R^3)_b(R^4)_c \qquad (I),$$

where M is selected from Ti, Zr, and Cr, $R^1$ is represented by —O—Y, where Y may be a straight or branched alkyl, alkenyl, cycloalkyl, or aryl group having 1 to 30 carbon atoms, wherein $R^2$, $R^3$, and $R^4$ are hydrocarbyl ligands having 1 to 30 carbon atoms, wherein at least one of $R^2$, $R^3$, and $R^4$ comprises the organofunctional group, and a sum of n+a+b+c=4.

6. The method of claim 5, wherein the $R^2$ ligand comprises an amino organofunctional group and is selected from the group consisting of: —O—$(CH_2)_y NH_2$, —$(CH_2)_y NH_2$, —O—$(CH_2)_y NRR'$, —$(CH_2)_y NRR'$, —O—R"$NH_2$, —R"$NH_2$, —O—R"NRR', and —R"NRR', where y is 1 to 30, and R, R', and R" are straight or branched alkyl groups having 1 to 30 carbon atoms.

7. The method of claim 1, wherein the organometallic adhesion promoter is selected from the group consisting of: neoalkoxytris(m-aminophenyl) zirconate, neoalkoxytris(ethylenediaminoethyl) zirconate, neoalkoxytrisneodecanoyl zirconate, neoalkoxytris(dodecanoyl)benzene sulfonyl zirconate, neoalkoxytris(dodecyl)benzenesulfonyl zirconate, zirconium propionate, neoalkoxytris(dioctyl) phosphate zirconate, neoalkoxytris(dioctyl)pyrophosphate zirconate, tris(dioctylpyrophosphate)ethylene titanate, tetra (2,2-diallyloxymethyl)butyl, bis(ditridecyl)phosphito zirconate, neopentyl(diallyl)oxytrisneodecanoyl zirconate, neopentyl(diallyl)oxytris(dodecyl)benzenesulfonyl zirconate, neopentyl(diallyl)oxytris(dioctyl)phosphate zirconate, neopentyl(diallyl)oxytris(dioctyl)pyrophosphate zirconate, tris(dioctylpyrophosphate)ethylene titanate, neopentyl(diallyl)oxytris(N-ethylenediamino)ethyl zirconate, neopentyl(diallyl)oxytris(m-amino)phenyl zirconate, neopentyl(diallyl)oxytrismethacryl zirconate, neopentyl(diallyl) oxytrisacryl zirconate, dineopentyl(diallyl)oxydiparamino benzoyl zirconate, dineopentyl(aiallyl)oxy bis(3-mercapto) propionic zirconate, zirconium IV 2-ethyl, 2-propenolatomethyl 1, 3-propanediolato, cyclo di2,2-(bis 2-propenolatomethyl)butanolato pyrophosphato-O,O,tetra(2,2 diallyloxymethyl)butyl, neopentyl(diallyl)oxy, trimethacryl zirconate, methacryloxy aluminozirconate, isopropyl tris(N-ethylaminoethylamino)titanate, isopropyl triisostearoyl titanate, titanium bis(dioctylpyrophosphate)oxy acetate, tetraisopropyl bis(dioctylphosphito)titanate, neoalkoxytri[p-N-(β-aminoethyl)amino phenyl]titanate, isopropyl trioctanoyl titanate, isopropyl diisostearoylcumylphenyl titanate, isopropyl tricumylphenyl titanate, isopropyl distearoylmethacryl titanate, isopropyl diniethacrylisostearoyl titanate, isopropyl tris(dodecylbenzenesulfonyl)titanate, isopropyl diisostearoylacryl titanate, isopropyl diisostearoylacryl titanate, isopropyl isostearoyldiacryl titanate, isopropyl isostearoyldiacryl titanate, isopropyl tris(dioctylphosphate) titanate, isopropyl tri-n-stearoyl titanate, isopropyl 4-aminobenzenesulfonyl-bis(dodecylbenzenesulfonyl)titanate, isopropyl trimethacryl titanate, isopropyl trimethacrylonitrile titanate, isopropyl bis(4-aminobenzoyl)isostearoyl titanate, isopropyl tris(dioctylpyrophosphate)titanate, tris(dioctylpyrophosphate)ethylene titanate, isopropyl triacryl titanate, isopropyl tris(N,N-dimethyl-ethylamino)titanate, isopropyl tris(N-ethylamino-ethylamino)titanate, isopropyl triacryl titanate, isopropyl tris(N,N-dimethyl-ethylamino)titanate, isopropyl tris(N-ethylamino-ethylamino)titanate, isopropyl trianthranyl titanate, isopropyl tris(octylbutylpyrophosphate)titanate, and isopropyl tris(butylmethylpyrophosphate)titanate, octylene glycol titanate, (tetrakis) 2-ethylhexane-1, 3-(diolato)titanate, tetrakis(biethylamido)titanate, tetraisopropylbis(dioctylphosphite)titanate, tetraoctylbis (ditridecylphosphite)titanate, tetra(2,2-diallyloxymethyl-1-butyl)bis(ditridecyl)phosphite titanate, diisostearoyl oxyacetatetitanate, isostearoyl methacryloxyacetatetitanate, isostearoyl acryloxyacetatetitanate, bis(dioctylphosphate) oxyacetatetitanate, 4-amino benzenesulfonyldodecylbenzene sulfonyloxyacetatetitanate, dimethacryloxyacetatetitanate, dicumylphenolateoxyacetate titanate, 4-aminobenzoylisostearoyloxyacetate titanate, bis(dioctylpyrophosphate)oxyacetate titanate, diacryloxyacetate titanate, bis(octylbutylpyrophosphate)oxyacetate titanate, diisostearoylethylene titanate, isostearoylmethacrylethylene titanate, bis(dioctylphosphate)ethylene titanate, 4-aminobenzenesulfonyldodecylbenzenesulfonylethylene titanate, dimethacrylethylene titanate, 4-aminobenzenesulfonylisostearoylethylene titanate, bis(dioctylpyrophosphate) ethylene titanate, diacrylethylene titanate, dianthranylethylenetitanate, bis(butylmethylpyrophosphate)ethylene titanate, and combinations thereof.

8. The method of claim 1, wherein the metal-coated substrate is a plastic substrate comprising a polymer selected from the group consisting of: acrylonitrile butadiene styrene (ABS), acrylonitrile butadiene styrene/polycarbonate (ABS/PC), polycarbonate (PC), polyamide (PA), polypropylene (PP), polyolefins, thermoplastic olefins (TPOs), polyphenyleneoxide (PPO), polyphenylene ether, polyimides, polyether imide (PEI), polyether ether ketone (PEEK), polyphenylene sulfide, polyphthalamide, polyurethane (PU), polybutylene terephthalate (PBT), polycarbonate/polybutylene terephthalate (PC/PBT), polyacrylates, polyesters, polyethers, polyketones, copolymers, and combinations thereof.

9. The method of claim 1, wherein the organic paint precursor material comprises multiple layers of solvent-borne or waterborne polymeric layers applied over the organometallic adhesion promoter.

10. The method of claim 1, wherein the applying of the organic paint precursor material comprises first applying at least one layer of a paint primer over the applied organometallic adhesion promoter and then applying at least one layer of a precursor of a paint coating over the paint primer layer.

11. The method of claim 1, wherein the organic paint precursor material is a precursor of a polymeric material selected from the group consisting of: acrylic polymers, methacrylic polymers, styrenated acrylic polymers, epoxy polymers, polyurethane polymers, polyester polymers, polyvinyl ester polymers, polyvinylidene halide polymers, alkyd derived components, co-polymers, derivatives, and combinations thereof.

12. The method of claim 1, wherein the first metal of the metal-coated substrate is selected from the group consisting of: trivalent chromium (Cr(III)), hexavalent chromium (Cr (VI)), and combinations thereof.

13. The method of claim 1, wherein the surface of the metal-coated substrate is a chromium-containing surface layer to which the organometallic adhesion promoter is applied directly, to a surface of the metal-coated substrate and the second metal is selected from the group consisting of: zirconium (Zr), chromium (Cr), and combinations thereof, wherein the metal-coated substrate is a plastic substrate comprising a polymer selected from the group consisting of: acrylonitrile butadiene styrene (ABS) and acrylonitrile butadiene styrene/polycarbonate (ABS/PC).

14. A method for forming a robust polymeric paint coating on a metal-coated plastic substrate, the method comprising:

forming a metal coating on a plastic substrate, wherein the metal coating comprises a chromium-containing surface layer;

applying an organometallic adhesion promoter on the chromium-containing surface layer of the metal coating, wherein the organometallic adhesion promoter comprises (i) a transition metal selected from the group consisting of: zirconium (Zr), titanium (Ti), chromium (Cr), and combinations thereof, (ii) a first ligand complexed to the transition metal comprising an organofunctional group selected from the group consisting of: amino, glycidyloxy, hydroxy, carboxy, allyl, vinyl, acrylate, meth(acrylate), and combinations thereof, and (iii) a second ligand complexed to the transition metal having an alkoxy group, so that the alkoxy group of the second ligand of the organometallic adhesion promoter reacts with the chromium-containing surface layer; and applying one or more layers of an organic paint precursor material over the organometallic adhesion promoter so the organofunctional group of the first ligand reacts with at least a portion of the organic paint precursor material to form the robust polymeric paint coating over the metal coating on the plastic substrate.

15. The method of claim 14, further comprising curing or cross-linking the one or more layers of organic paint precursor material to form the robust polymeric paint coating over the metal coating on the plastic substrate.

16. The method of claim 14, wherein the forming of the metal coating includes at least one plating process selected from the group consisting of: an electroless bath, an electroplating bath, and combinations thereof.

17. The method of claim 14, wherein before the forming of the metal coating, a surface of the plastic substrate is etched with an etching solution comprising chromium and sulfuric acid, followed by depositing a first metal layer via an electroless plating process to deposit at least one metal selected from the group consisting of: nickel (Ni), copper (Cu), and combinations thereof, followed by a first electroplating process to form at least one copper (Cu) layer, a second electroplating process to form at least one nickel (Ni) layer, and a third electroplating process to form at least one chromium (Cr) layer.

18. The method of claim 14, wherein the organic paint precursor material is a precursor of a polymeric material selected from the group consisting of: acrylic polymers, methacrylic polymers, styrenated acrylic polymers, epoxy polymers, polyurethane polymers, polyester polymers, polyvinyl ester polymers, polyvinylidene halide polymers, alkyd derived components, co-polymers, derivatives, and combinations thereof.

19. The method of claim 14, wherein the transition metal is selected from the group consisting of: zirconium (Zr), chromium (Cr), and combinations thereof, and the metal-coated plastic substrate comprises a polymer selected from the group consisting of: acrylonitrile butadiene styrene (ABS) and acrylonitrile butadiene styrene/polycarbonate (ABS/PC).

20. A robust transparent polymeric paint coating on a metal-coated plastic substrate comprising:

a metal coating on a plastic substrate, wherein the metal coating comprises a chromium-containing surface layer;

an organometallic adhesion promoter layer disposed over the chromium-containing surface layer of the metal coating, wherein the organometallic adhesion promoter layer comprises (i) a transition metal selected from the group consisting of: zirconium (Zr), titanium (Ti), chromium (Cr), and combinations thereof, (ii) a first ligand complexed to the transition metal comprising an organofunctional group selected from the group consisting of: amino, glycidyloxy, hydroxy, carboxy, allyl, vinyl, acrylate, meth(acrylate), other unsaturated hydrocarbon groups, nitrogen-containing organic groups, halides, epoxides, and combinations thereof, and (iii) a second ligand complexed to the transition metal having a hydrolysable functional group selected from the group consisting of: an alkoxy group, an aryloxy group, and a carboxy group; and one or more layers of a polymeric paint coating disposed over the organometallic adhesion promoter layer, wherein the hydrolysable functional group of the second ligand of the organometallic adhesion promoter layer is bonded to the chromium-containing surface layer of the metal coating on the plastic substrate and the organofunctional group of the first ligand is bonded to at least a portion of the polymeric paint coating, so that the organometallic adhesion promoter layer forms a robust bond between the polymeric paint coating and the metal-coated plastic substrate.

21. The robust transparent polymeric paint coating of claim 20, wherein the organofunctional group of the first ligand is selected from the group consisting of: amino, glycidyloxy, epoxy, hydroxy, carboxy, allyl, vinyl, acrylate, meth(acrylate), and combinations thereof.

22. The robust transparent polymeric paint coating of claim 20, wherein the organofunctional group of the first ligand comprises an amino group, the hydrolysable functional group of the second ligand comprises an alkoxy, and the transition metal comprises titanium (Ti) or zirconium (Zr).

23. The robust transparent polymeric paint coating of claim 20, wherein the organometallic adhesion promoter layer is represented by the general formula (I):

$(R^1)_n\text{-}M(R^2)_a(R^3)_b(R^4)_c$            (I), where M is selected from Ti, Zr, and Cr, $R^1$ is represented by —O—Y, where Y may be a straight or branched alkyl, alkenyl, cycloalkyl, or aryl group having 1 to 30 carbon atoms, wherein $R^2$, $R^3$, and $R^4$ are hydrocarbyl ligands having 1 to 30 carbon atoms, wherein at least one of $R^2$, $R^3$, and $R^4$ comprises the organofunctional group, and a sum of n+a+b+c=4.

24. The robust transparent polymeric paint coating of claim 23, wherein the $R^2$ ligand comprises an amino organofunctional group and is selected from the group consisting of: —O—$(CH_2)_y$$NH_2$, —$(CH_2)_y$$NH_2$, —O—$(CH_2)_y$NRR', —$(CH_2)_y$NRR', —O—R"$NH_2$, —R"$NH_2$, —O—R"NRR', and —R"NRR', where y is 1 to 30, and R, R', and R" are straight or branched alkyl groups having 1 to 30 carbon atoms.

25. The robust transparent polymeric paint coating of claim 20, wherein the organometallic adhesion promoter layer is selected from the group consisting of: neoalkoxytris(m-aminophenyl) zirconate, neoalkoxytris(ethylenediaminoethyl) zirconate, neoalkoxytrisneodecanoyl zirconate, neoalkoxytris(dodecanoyl)benzene sulfonyl zirconate, neoalkoxytris(dodecyl)benzenesulfonyl zirconate, zirconium propionate, neoalkoxytris(dioctyl)phosphate zirconate, neoalkoxytris(dioctyl)pyrophosphate zirconate, tris(dioctylpyrophosphate)ethylene titanate, tetra(2,2-diallyloxymethyl)butyl, bis(ditridecyl)phosphito zirconate, neopentyl(diallyl)oxytrisneodecanoyl zirconate, neopentyl (diallyl)oxytris(dodecyl)benzenesulfonyl zirconate, neopentyl(diallyl)oxytris(dioctyl)phosphate zirconate, neopentyl (diallyl)oxytris(dioctyl)pyrophosphate zirconate, tris(dioctylpyrophosphate)ethylene titanate, neopentyl(diallyl)oxytris(N-ethylenediamino)ethyl zirconate, neopentyl(diallyl)oxytris(m-amino)phenyl zirconate, neopentyl(diallyl)oxytrismethacryl zirconate, neopentyl(diallyl)oxytrisacryl zirconate, dineopentyl(diallyl)oxydiparamino benzoyl zirconate, dineopentyl(aiallyl)oxy bis(3-mercapto) propionic zirconate, zirconium IV 2-ethyl, 2-propenolatomethyl 1, 3-propanediolato, cyclo di2,2-(bis 2-propenolatomethyl)butanolato pyrophosphato-O,O,tetra(2,2 diallyloxymethyl)butyl, neopentyl(diallyl)oxy, trimethacryl zirconate, methacryloxy aluminozirconate, isopropyl tris(N-ethylaminoethylamino)titanate, isopropyl triisostearoyl titanate, titanium bis(dioctylpyrophosphate)oxy acetate, tetraisopropyl bis(dioctylphosphito)titanate, neoalkoxytri[p-N-(β-aminoethyl)amino phenyl]titanate, isopropyl trioctanoyl titanate, isopropyl diisostearoylcumylphenyl titanate, isopropyl tricumylphenyl titanate, isopropyl distearoylmethacryl titanate, isopropyl diniethacrylisostearoyl titanate, isopropyl tris(dodecylbenzenesulfonyl)titanate, isopropyl diisostearoylacryl titanate, isopropyl diisostearoylacryl titanate, isopropyl isostearoyldiacryl titanate, isopropyl isostearoyldiacryl titanate, isopropyl tris(dioctylphosphate)titanate, isopropyl tri-n-stearoyl titanate, isopropyl 4-aminobenzenesulfonyl-bis(dodecylbenzenesulfonyl)titanate, isopropyl trimethacryl titanate, isopropyl trimethacrylonitrile titanate, isopropyl bis(4-aminobenzoyl)isostearoyl titanate, isopropyl tris(dioctylpyrophosphate)titanate, tris(dioctylpyrophosphate)ethylene titanate, isopropyl triacryl titanate, isopropyl tris(N,N-dimethyl-ethylamino)titanate, isopropyl tris(N-ethylamino-ethylamino)titanate, isopropyl triacryl titanate, isopropyl tris(N,N-dimethyl-ethylamino)titanate, isopropyl tris(N-ethylamino-ethylamino)titanate, isopropyl trianthranyl titanate, isopropyl tris(octylbutylpyrophosphate)titanate, and isopropyl tris(butylmethylpyrophosphate)titanate, octylene glycol titanate, (tetrakis) 2-ethylhexane-1,3-(diolato)titanate, tetrakis(biethylamido)titanate, tetraisopropylbis(dioctylphosphite)titanate, tetraoctylbis(ditridecylphosphite)titanate, tetra(2,2-diallyloxymethyl-1-butyl)bis(ditridecyl)phosphite titanate, diisostearoyl oxyacetatetitanate, isostearoyl methacryloxyacetatetitanate, isostearoyl acryloxyacetatetitanate, bis(dioctylphosphate)oxyacetatetitanate, 4-amino benzenesulfonyldodecylbenzene sulfonyloxyacetatetitanate, dimethacryloxyacetatetitanate, dicumylphenolateoxyacetate titanate, 4-aminobenzoylisostearoyloxyacetate titanate, bis(dioctylpyrophosphate)oxyacetate titanate, diacryloxyacetate titanate, bis(octylbutylpyrophosphate)oxyacetate titanate, diisostearoylethylene titanate, isostearoylmethacrylethylene titanate, bis(dioctylphosphate)ethylene titanate, 4-aminobenzenesulfonyldodecylbenzenesulfonylethylene titanate, dimethacrylethylene titanate, 4-aminobenzenesulfonylisostearoylethylene titanate, bis(dioctylpyrophosphate) ethylene titanate, diacrylethylene titanate, dianthranylethylenetitanate, bis(butylmethylpyrophosphate)ethylene titanate, and combinations thereof.

26. The robust transparent polymeric paint coating of claim 20, wherein the chromium-containing surface layer comprises trivalent chromium (Cr(III)) or hexavalent chromium (Cr(VI)).

27. The robust transparent polymeric paint coating of claim 20, wherein the plastic substrate comprises a polymer selected from the group consisting of: acrylonitrile butadiene styrene (ABS), acrylonitrile butadiene styrene/polycarbonate (ABS/PC), polycarbonate (PC), polyamide (PA), polypropylene (PP), polyolefins, thermoplastic olefins (TPOs), polyphenyleneoxide (PPO), polyphenylene ether, polyimides, polyether imide (PEI), polyether ether ketone (PEEK), polyphenylene sulfide, polyphthalamide, polyurethane (PU), polybutylene terephthalate (PBT), polycarbonate/polybutylene terephthalate (PC/PBT), polyacrylates, polyesters, polyethers, polyketones, copolymers, and combinations thereof.

28. The robust transparent polymeric paint coating of claim 20, wherein the transition metal is selected from the group consisting of: zirconium (Zr), chromium (Cr), and combinations thereof, and the plastic substrate comprises a polymer selected from the group consisting of: acrylonitrile butadiene styrene (ABS) and acrylonitrile butadiene styrene/polycarbonate (ABS/PC).

* * * * *